United States Patent
Sung et al.

(10) Patent No.: US 9,473,964 B2
(45) Date of Patent: Oct. 18, 2016

(54) METHODS AND SYSTEMS FOR ESTIMATING NETWORK PERFORMANCE

(71) Applicant: Pismo Labs Technology Limited, Hong Kong (HK)

(72) Inventors: Patrick Ho Wai Sung, Hong Kong (HK); Chin To Yeung, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 211 days.

(21) Appl. No.: 14/369,717

(22) PCT Filed: Oct. 16, 2013

(86) PCT No.: PCT/IB2013/059376
§ 371 (c)(1),
(2) Date: Jun. 30, 2014

(87) PCT Pub. No.: WO2015/056051
PCT Pub. Date: Apr. 23, 2015

(65) Prior Publication Data
US 2016/0174085 A1 Jun. 16, 2016

(51) Int. Cl.
H04W 24/06 (2009.01)
H04L 5/00 (2006.01)
H04L 12/26 (2006.01)

(52) U.S. Cl.
CPC ............ *H04W 24/06* (2013.01); *H04L 5/0048* (2013.01); *H04L 43/08* (2013.01)

(58) Field of Classification Search
None
See application file for complete search history.

(56) References Cited

U.S. PATENT DOCUMENTS

| 8,001,266 B1 | 8/2011 | Gonzalez et al. |
| 2005/0021751 A1 | 1/2005 | Block et al. |
| 2010/0125661 A1* | 5/2010 | Perala ............... G06F 15/173 709/224 |
| 2010/0128623 A1 | 5/2010 | Dunn et al. |

(Continued)

FOREIGN PATENT DOCUMENTS

| CN | 101170581 A | 4/2008 |
| WO | 2013085486 A1 | 6/2013 |

OTHER PUBLICATIONS

International Search Report in International Application No. PCT/IB2013/059376, mailed on Jul. 16, 2014.

(Continued)

*Primary Examiner* — Christine Duong

(57) ABSTRACT

A method carried out by a first node for estimating network performance by selecting at least one network interface of the first node and at least one network interface of a second node and then transmitting reference packets to the second node. The reference packets are transmitted through the selected network interfaces of the first node to the selected network interfaces of the second node. After receiving the reference packets, the second node generates arrival information and sends the arrival information to the first node. The first utilizes the arrival information for estimating the network performance. The network interfaces are selected according to a policy and end-to-end connection(s) may be established between selected network interfaces of the first node and selected network interfaces of the second node. The end-to-end connection(s) may be aggregated to form an aggregated end-to-end connection. Alternatively, the network interfaces are selected according to an end-to-end connection profile or an aggregated end-to-end connection profile.

20 Claims, 15 Drawing Sheets

(56) References Cited

U.S. PATENT DOCUMENTS

2010/0211673 A1 8/2010 Kosbab et al.
2013/0308468 A1* 11/2013 Cowie .................... H04L 43/04
370/248

OTHER PUBLICATIONS

Written opinion of the International Searching Authority in International Application No. PCT/IB2013/059376, mailed on Jul. 16, 2014.

* cited by examiner

| Row | WAN interface 121-1 | WAN interface 121-2 | WAN interface 121-3 | WAN interface 122-1 | WAN interface 122-2 | Throughput (Mbps) | Packet Loss (%) | RTT (ms) |
|---|---|---|---|---|---|---|---|---|
| Row1 | o | | | o | | 53.67 | 0.00 | 4.85 |
| Row2 | o | | | | o | 54.55 | 1.00 | 3.33 |
| Row3 | | o | | o | | 56.30 | 0.00 | 5.04 |
| Row4 | | o | | | o | 65.20 | 0.00 | 4.97 |
| Row5 | | | o | o | | 53.77 | 0.00 | 5.27 |
| Row6 | | | o | | o | 53.76 | 0.00 | 4.79 |
| Row7 | o | | o | o | | 53.68 | 3.50 | 8.53 |
| Row8 | o | | | | | 53.67 | 0.00 | 3.16 |
| Row9 | o | o | | o | | 59.37 | 0.00 | 5.20 |
| Row10 | o | | o | | | 78.90 | 0.00 | 4.39 |
| Row11 | | o | o | | | 80.25 | 0.00 | 4.29 |
| Row12 | | o | o | o | | 75.50 | 0.00 | 3.17 |
| Row13 | o | o | o | | | 72.80 | 0.00 | 3.25 |
| Row14 | o | o | o | | o | 86.50 | 10.30 | 3.67 |
| Row15 | o | | | o | o | 82.05 | 0.00 | 7.54 |
| Row16 | | o | | o | o | 87.90 | 0.00 | 6.25 |
| Row17 | | o | o | o | o | 87.14 | 0.00 | 2.20 |
| Row18 | o | o | | o | o | 88.70 | 0.54 | 8.01 |
| Row19 | o | | o | o | o | 89.22 | 0.00 | 3.54 |
| Row20 | | o | o | o | o | 89.20 | 0.00 | 3.22 |
| Row21 | o | o | o | o | o | 89.38 | 0.00 | 4.21 |

Fig. 8

METHODS AND SYSTEMS FOR ESTIMATING NETWORK PERFORMANCE

TECHNICAL FIELD

The present invention relates in general to the field of computer networks. More particularly, the present invention relates to methods and systems for estimating network performance of end-to-end connections between two nodes. The network performance is estimated by transmitting reference packets and receiving arrival information corresponding to the reference packets. Network performance information is then generated based on the arrival information.

BACKGROUND ART

A first node having a plurality of wide area network (WAN) interfaces can use one or more of the plurality of WAN interfaces to transmit packets to a second node. A network interface of the first node may be connected to an access network to connect the first node to interconnected networks, such as a public network or a private network. The first node can select one or more of the WAN interfaces to transmit packets according to network performance of the access networks. Furthermore, when the second node also has a plurality of WAN interfaces, the first node can also select one or more of the WAN interfaces of the second node as the destination for the packets. For example, if the first node has M WAN interfaces and the second node has N WAN interfaces, then there are M×N possible combinations.

Furthermore, one or more tunnels or end-to-end connections can be established between one network interface of the first node and one network interface of the second node. The tunnels or end-to-end connections can be aggregated together to form an aggregated tunnel or aggregated end-to-end connection. As a result, the number of tunnels or end-to-end connections in the aggregated tunnel or aggregated end-to-end connection is between one and M×N.

It is also possible to have more than one aggregated tunnel or aggregated end-to-end connection and therefore there could more than M×N tunnels between the first node and the second node.

The problem is to determine which WAN interface should be selected for transmission at the first node and which network interface should be selected for receiving at the second node. Furthermore testing network performance could be time consuming, especially when there is a plurality of end-to-end connections. To make the testing more complicated, traffic passing through an end-to-end connection may impact network performance of another end-to-end connection, even when the end-to-end connection are independently connected.

When there is a lot of network performance information, it is difficult to display all network performance information at the same time. It is not always necessary to display all network performance information, especially when an aggregated end-to-end connection comprises many end-to-end connections.

DISCLOSURE OF INVENTION

Summary

According to one of the embodiments of the present invention, the steps to estimate network performance are: select at least one first network interface of a first node; select at least one second network interface of a second node; transmit reference packets from the first node to the second node through the at least one first network interface to the at least one second network interface; receive arrival information corresponding to the reference packets from the second node; and then finally estimate network performance by utilizing the arrival information. The network interfaces at the first node and/or second node can be selected according to a first policy. An end-to-end connection can be first established between a network interface of the first node and a network interface of the second node before network performance estimation is performed for the end-to-end connection by transmitting reference packets through the established end-to-end connection. The network performance information resulting from the network performance estimation can be stored locally at the first node and/or the second node, and/or remotely at a storage unit.

Furthermore, an aggregated end-to-end connection is established between the first node and the second node, and network performance estimation is performed for this aggregated end-to-end connection. The aggregated end-to-end connection comprises a plurality of end-to-end connections formed between the first node and the second node.

According to one of the embodiments of the present invention, the network performance estimation is performed within a time-period. If the network performance estimation cannot be completed within the time-period, the network performance estimation will be stopped. This may result in partially completed network performance information.

According to one of the embodiments of the present invention, the first node transmits reference packets substantially at the same time through the end-to-end connections. In one variant, the first node does not transmit reference packets through the same network interface, which has a plurality of end-to-end connections established with the second node, substantially at the same time in order to avoid not estimating the network performance accurately.

According to one of the embodiments of the present invention, the selection of network interfaces are performed according to an end-to-end connection profile or an aggregated end-to-end connection profile. Therefore network performance estimation is performed by transmitting reference packets through the network interfaces specified in the end-to-end connection profile or an aggregated end-to-end connection profile.

According to one of the embodiments of the present invention, a message is sent after the network performance estimation is performed or partially performed. The message is used to warn, help, suggest to, and remind a user based on the network performance estimated or network performance information retrieved.

DETAILED DESCRIPTION

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage unit, such as a secondary storage.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program instructions or code segments to perform the necessary tasks may be stored in a machine readable medium such as storage unit. A processing unit(s) may perform the necessary tasks. A processing unit(s) can be a CPU, an ASIC semiconductor chip, a semiconductor chip, a logical unit, a digital processor, an analog processor, a FPGA or any processor that is capable of performing logical and arithmetic functions. A code segment may represent a procedure, a function, a subprogram, a program, a routine, a subroutine, a module, a software package, a class, or any combination of instructions, data structures, or program statements. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

An access connection may carry one or more protocol data, including but not limited to Transmission Control Protocol (TCP), User Datagram Protocol (UDP), Internet Control Message Protocol (ICMP), Hypertext Transfer Protocol (HTTP), Post Office Protocol (POP3), File Transfer Protocol (FTP), and Internet Message Access Protocol (IMAP). An access connection may be a wired network or a wireless network. A wired access connection may be implemented using Ethernet, fiber optic, cable, DSL, frame relay, token ring, serial bus, USB, Firewire, PCI, T1, or any material that can pass information. A wireless access connection may be implemented using infrared, High-Speed Packet Access (HSPA), HSPA+, Long Term Evolution (LTE), WiMax, ATM, GPRS, EDGE, GSM, CDMA, WiFi, CDMA2000, WCDMA, TD-SCDMA, BLUETOOTH, WiBRO or any other wireless technologies.

An end-to-end connection is a connection between a source node and a destination node that can be made at either layer 2 or layer 3 of the (Open Systems Interconnection) OSI model that connects two endpoints over a public, private or hybrid public and private network to form a connection. Virtual private network (VPN) is one example of end-to-end connection models. A VPN can be a Layer 2 VPN or Layer 3 VPN. An end-to-end connection can also be established using connection oriented communication protocol, such as transmission control protocol (TCP).

An end-to-end connection may include one or more communication links and one or more intermediate nodes. An end-to-end connection may be a tunnel. In one of the embodiments of the present invention, an end-to-end connection between a source node and a destination node is a virtual private network (VPN) tunnel.

An end-to-end connection profile specifies the configurations or parameters needed to establish one or more end-to-end connections, and transmit and receive data packets through the one or more end-to-end connections. These configurations or parameters may include WAN interface identities, source address of WAN interfaces, destination address of WAN interfaces, and encryption standard for packets transmitted and received through the one or more end-to-end connections. The end-to-end connection profile may also comprise authentication parameters, details of digital certificates used for authentication, or any other information used in establishing the one or more end-to-end connections between two nodes. An end-to-end connection profile may be used as a VPN profile to establish one or more VPNs. In one variant, the configurations or parameters also includes one or more policies for selecting WAN interfaces to establish an end-to-end connection.

An aggregated end-to-end connection profile specifies the configurations or parameters needed to establish an aggregated end-to-end connection, and transmit and receive data packets through the aggregated end-to-end connection. These configurations or parameters may include WAN interface identities, source address of WAN interfaces, destination address of WAN interfaces and encryption standard, and one or more end-to-end connection profiles. The aggregated end-to-end connection profile may also comprise authentication parameters, details of digital certificates used for authentication, or any other information used in establishing the aggregated end-to-end connections between two nodes. An end-to-end connection profile may be used as a VPN profile to establish one or more VPNs. In one variant, the configurations or parameters also includes one or more policies for selecting end-to-end connections as part of the aggregated end-to-end connection. For example, in an aggregated end-to-end connection profile, WAN interface identities of a first node, WAN interface identities of a second node, and encryption standard are specified for establishing a plurality of end-to-end connections; are also specified. In another example, an aggregated end-to-end connection profile specifies a plurality of end-to-end connection profiles while each end-to-end connection profile specifies configurations to establish an end-to-end connection.

A plurality of established end-to-end connections can be aggregated, combined or bonded together to form one aggregated end-to-end connection. Those skilled in the arts would appreciate that there are myriad ways to aggregate, combine, or bond a plurality of established end-to-end connections to form one aggregated end-to-end connection. An aggregated end-to-end connection is perceived as one end-to-end connection by sessions or applications that are using it. An aggregated end-to-end connection can be perceived as a tunnel, a virtual private network or connection or connectionless oriented connection. For example, an aggregated end-to-end connection is a TCP connection. In another example, an aggregated end-to-end connection is a UDP connection. In another example, an aggregated end-to-end connection is an aggregation of a plurality of tunnels, and each tunnel is linked between a first node and a second node. In another example, an aggregated end-to-end connection is a VPN tunnel, comprising a plurality of established end-to-end connections, and each established end-to-end connection is linked between a first node and a second node.

A policy can be used to select end-to-end connections belonging to an aggregated end-to-end connection. The selection can be based on network performance, network interfaces, type of access network, user's preference, default configurations, etc. According to one of the embodiments of the present invention, the policy to select end-to-end connection is based on network performance estimated. Alternatively, the policy selects end-to-end connections for an aggregated end-to-end connection according to the order of WAN interfaces at a network node first and then selects end-to-end connections whose network performance satisfies a threshold for the same aggregated end-to-end connections. Therefore, after network performance estimation is done, some of end-to-end connections may be removed from the aggregated end-to-end connection while some of end-to-end connections may be added. This allows a node to have an aggregated end-to-end connection to be set-up quickly and then optimize its network performance by adding, removing and maintain end-to-end connection(s) in the aggregated end-to-end connection.

According to one of the embodiments of the present invention, the aggregated end-to-end connection is established according to an aggregated end-to-end connection profile, such that each of the end-to-end connections that are bonded to form the aggregated end-to-end connection are established according to the configurations or parameters specified in the aggregated end-to-end connection profile.

FIG. 1A illustrates a network environment in system 101 according to one of the embodiments of the present invention. System 101 includes multiple sites 102 and 104, which comprise at least one node 106 and node 108 respectively. Nodes 106 and 108 are connected over network 110. Network 110 may comprise a local area network (LAN), metropolitan area network (MAN), wide area network (WAN), wireless network, the public switched telephone network (PSTN), the Internet, an intranet, an extranet, etc.

Site 102 and node 106 may comprise M access connections 112, and site 104 and node 108 may comprise N access connections 114. Access connections 112 and 114 are for communicating information within network 110 between sites 102 and 104. In the illustrated embodiment. M is equal to 3 and N is equal to 2; however, these values may vary according to desired devices and configurations. Access connections 112 and 114 may have similar or differing bandwidth capabilities. Furthermore, access connections 112 and 114 may comprise different types of WAN connections, such as a WiFi, cable, DSL, T1, 3G. 4G. LTE, satellite connections, and the like. It is also noted that site 102 and site 104 may be thought of as both a sender or receiver, and discussions regarding the functionality of either site may be implemented on the other site. In other words, system 100 may be implemented as a symmetrical network.

Nodes 106 and 108 can work as a gateway, a router, a switch, an access point, a hub, a bridge, etc.

FIG. 1B illustrates system 100 adapted according to one of the embodiments where M×N end-to-end connections 116 are created between node 106 and 108. In the illustrated embodiment, M is equal to 3 and N is equal to 2. End-to-end connections 116 are established through WAN interfaces 121-1, 121-2 and 121-3 of node 106 and WAN interfaces 122-1 and 122-2 of node 108. End-to-end connections 116 correspond to a unique permutation of access connections 112 of site 102 and access connections 114 of site 104. In one variant, an aggregated end-to-end connection can be formed by using two or more of end-to-end connections 116.

FIG. 2 is an illustrative block diagram of a network node, such as node 106, according to one of the embodiments of the present invention. Node 106 comprises processing unit 201, main memory 202, system bus 203, secondary storage 204, and plurality of network interfaces 205. Processing unit 201 and main memory 202 are connected to each other directly. System bus 203 connects processing unit 201 directly or indirectly to secondary storage 204, and plurality of network interfaces 205. Using system bus 203 allows node 106 to have increased modularity. System bus 203 couples processing unit 201 to secondary storage 204, and plurality of network interfaces 205. System bus 203 can be any of several types of bus structures including a memory bus, a peripheral bus, and a local bus using any of a variety of bus architectures. Secondary storage 204 stores program instructions for execution by processing unit 201. Secondary storage 204 may further store policies for selecting network interfaces and/or end-to-end connections, transmittal information of reference packets, arrival information of reference packets, and network performance information of end-to-end connections. One or more network interfaces 205 are connected to corresponding access connections. Node 106 uses one or more access connections to connect to one or more public networks and/or private networks as illustrated in FIG. 1A. For illustration purpose, WAN interface 205a, 205b and 205c are network interfaces 121-1, 121-2 and 121-3 respectively and connected to the access connections 112-1, 112-2 and 112-3 respectively. In one embodiment, node 108 may also be embodied as the network node illustrated in FIG. 2. In this case, network interfaces 205a and 205b are network interfaces 122-1 and 122-2 respectively, and network interface 205c is omitted.

Selection of WAN Interface and End-to-End Connection

FIG. 3A illustrates a process for estimating network performance according to one of the embodiments of the present invention. At step 301, processing unit 201 of a first node, such as node 106, selects at least one of WAN interface for transmitting reference packets. For illustration purpose, WAN interface 121-1 is selected. At step 302, processing unit 201 selects at least one WAN interface of a second node, such as node 108, for receiving reference packets. For illustration purpose. WAN interface 122-1 is selected. The selection can be performed by specifying the IP address or host name of WAN interface 122-1. Then at step 303, processing unit 201 sends reference packets from WAN interface 121-1 to WAN interface 122-1. At step 304, processing unit 201 records transmittal information corresponding to the reference packets. In one variant, step 304 is performed before step 303 and the reference packets are transmitted according to the transmittal information at step 303. After node 108 receives the reference packets from WAN interface 121-1, node 108 generates arrival information corresponding to the reference packets, and sends the arrival information to node 106 through a WAN interface of node 108. Node 106 receives the arrival information from node 108 in step 305. At step 306, based on the transmittal information and arrival information, processing unit 201 is able to estimate network performance experienced by the reference packets. Network performance information, which is the results of network performance estimation, can be stored in main memory 202 or secondary storage 204. In one variant, network performance information can be stored remotely in node 108, a remote node, a remote server, a laptop, a handheld computer, a mobile phone, a desktop computer, or any other device capable of storing such information.

In one of the embodiments illustrated in FIG. 3B, after selecting WAN interfaces of nodes 106 and 108 in step 301 and 302 respectively, node 106 establishes at least one end-to-end connection with node 108 through the selected WAN interface(s) in step 310. Node 106 transmits reference packets through the at least one end-to-end connection to node 108 in step 311. Processing unit 201 records transmittal information corresponding to the reference packets in step 304 and receives arrival information corresponding to the reference packets from node 108 in step 305 when the reference packets are successfully received by node 108. Processing unit 201 is able to estimate the network performance of the at least one end-to-end connection based on the transmittal information and arrival information in step 306. In one variant, instead of selecting WAN interfaces, one or more end-to end connections are selected. As an end-to-end connection is established using a pair of WAN interfaces according to an end-to-end connection profile, the selection of an end-to-end connection is similar to selecting a WAN interface pair.

Estimation of Network Performance

In one example, a software can be used to measure network performance between two nodes. A command can be entered that allows node 106 to send reference packets to node 108 over a specific time period. Node 106 first exchanges test parameters with node 108 through control messages. Node 106 then transmits reference packets to node 108 through end-to-end connections selected by processing unit 201. The transmittal information may comprise the CPU usage of node 106 while transmitting the reference packets, the number of bytes transmitted over the specific time period, and the duration over which reference packets are transmitted. The transmittal information can be stored in secondary storage 204 or main memory 202. On the other hand, the arrival information may comprise the CPU usage of node 108 while receiving the reference packets, the number of bytes received over the specific time period, the duration over which the reference packets are received, number of reference packets that were retransmitted and round trip time (RTT). The network performance information may include the CPU usage of both nodes 106 and 108, and the rate at which node 108 received the reference packets. In another scenario, node 106 can estimate the network performance when reference packets are transmitted by node 108 and are received by node 106.

Without control message, node 108 may simply reply acknowledgement and the acknowledgement is then be used as arrival information. The control message sent by node 106 comprises information to let node 108 the type of information, such as packet drop rate, latency information, and out-of-order packets arrival, should be carried by arrival information.

In one variant, the control message is also embedded with information for establishing one or more end-to-end connections and/or one or more aggregated end-to-end connections. The information includes WAN interfaces identity used to establish end-to-end connections, WAN interfaces identity used to establish aggregated end-to-end connections information related to end-to-end connection profile, information related to aggregated end-to-end connection profile, estimation methodology, type of arrival information, format of arrival information, and choice of protocol.

Estimation methodology contained in the control message informs node 108 about what type of arrival information is expected, and the method of generating the arrival information. For example, when the user wants packet drop rate, latency and throughput experienced by the reference packets to be included in the arrival information, it is specified in the estimation methodology that the packet drop rate, latency and throughput must be estimated and the method for estimating is also included. Those skilled in the arts would know that there are myriad ways of estimating packet drop rate, latency and throughput. In one example, the estimation methodology specifies that packet drop rate should be estimated by using the Ping tool by generating an ICMP echo request and receiving an ICMP echo reply. The packets transmitted and received are counted and consequently the round-trip packet loss rate is calculated. Similarly, the estimation methodology also specifies the method for estimating latency, such as calculating the RTT, and estimating throughput, such as calculating the RTT and calculating the number of bytes received over a specific time period. Therefore, the arrival information comprising the packet drop rate, latency and throughput is utilized by node 106 to estimate the network performance accordingly.

The arrival information may contain information observed by node 108 regarding the network performance of the corresponding end-to-end connection or the corresponding aggregated end-to-end connection. The arrival information may also contain information about node 108, including processing load, disk usage, temperature and etc, and can be used to assist processing unit 201 to estimate overall system performance and the impact of transmitting packets through end-to-end connections or aggregated end-to-end connections on the computing resources. The arrival information can be transmitted in the form of internet packets. In one variant, the format of the arrival information is such that when there is a plurality of end-to-end connections, arrival information transmitted by node 108 contains arrival information of a plurality of or all end-to-end connections so that number of packets used to transmit arrival information could be smaller. It may be also easier for processing unit 201 to handle arrival information easier. In one variant, the format of the arrival information is such that when network performance of an aggregated end-to-end connection is being measured or estimated, the arrival information transmitted contains network performance information of all end-to-end connections corresponding to the aggregated end-to-end connection. Alternatively, network performance information obtained for each end-to-end connection of an aggregated end-to-end connection can be sent using the same end-to-end connection. This allows quicker transition of arrival information but may result in more number of packets containing arrival information transmitted.

Choice of protocol contained in the control message informs the node, which sends out arrival information, such as node 108, what protocol is used to transmit reference packet and also instructs node 108 how to transmit the arrival information. The arrival information can be sent using the same end-to-end connection, can be sent using other end-to-end connection or can be sent using connectionless based protocol. The benefits of using the same end-to-end connection include avoiding the need of establishing another end-to-end connection. The benefits of using different end-to-end connection include reducing the possibility of affecting the accuracy of network performance estimation. The benefits of using connectionless based protocol include simplicity but could result in loss of the arrival information.

Reference Packets:

The reference packets are IP packets transmitted using TCP, UDP or other protocols. The user can choose whether to send reference packets using TCP or UDP. The length of the reference packets can also be specified by the user.

One such software that can be used to measure the network performance is nuttcp. For example, the command that can be entered to allow node 106 to send reference packets to node 108 is "host1$ nuttcp host2", where host1 is node 106, and host2 is node 108. For setting the UDP reference packet length to 8192 bytes in nuttcp software, the command sent is "host1$ nuttcp -u -18k host2", where "-u" specifies that the reference packets should be UDP packets, and "-18k" specifies that the length of the UDP packets should 8192 bytes. In one variant, the packet length is equal to or less 1500 bytes because the maximum transmission unit (MTU) of Ethernet is 1500 bytes.

When a first node, such as node 106, has a plurality of WAN interfaces, processing unit 201 selects one of network interfaces 205 for transmitting reference packets. Similarly, when a second node, such as node 108, has a plurality of WAN interfaces, processing unit 201 also selects one of WAN interfaces of the second node for receiving the reference packets. According to one of the embodiments of the present invention, processing unit 201 selects a first WAN interface of node 106 and a second WAN interface of node 108 according to a policy. The main role of this policy is to instruct processing unit 201 how to choose a WAN interface of node 106 for transmitting the reference packets and how to choose a WAN interface of node 108 as the destination of the reference packets. The policy can be in the form of program instructions stored in secondary storage 204 or main memory 202. Alternatively the policy can be in the form of an algorithm as a function of number of WAN interfaces at node 106, number of WAN interfaces at node 108, and/or other parameters. Alternatively the policy can be first stated in a configuration file stored in secondary storage 204 and then interpreted by a program or program instructions for processing unit 201. For illustration purpose, a policy for selecting WAN interfaces of node 106 and node 108 is to select each pair of all possible combinations of WAN interface pairs in order to estimate network performance. As there are three WAN interfaces 121-1, 121-2 and 121-3 at node 106 and two WAN interfaces 122-1 and 122-2, there are six WAN interface pairs as illustrated in Table 001:

TABLE 001

| WAN interface pair | Through access connection | Through access connection |
|---|---|---|
| 121-1 and 122-1 | 112-1 | 114-1 |
| 121-2 and 122-1 | 112-2 | 114-1 |
| 121-3 and 122-1 | 112-3 | 114-1 |
| 121-1 and 122-2 | 112-1 | 114-2 |
| 121-2 and 122-2 | 112-2 | 114-2 |
| 121-3 and 122-2 | 112-3 | 114-2 |

Processing unit 201 first selects WAN interface pair 121-1 and 122-1 and sends reference packets from WAN interface 121-1 to WAN interface 122-1 through access connections 112-1 and 114-1. After network performance has been estimated for this WAN interface pair, i.e. 121-1 and 122-1, processing unit 201 then selects WAN interface pair 121-2 and 122-1 and sends reference packets from WAN interface 121-2 to WAN interface 122-1 through access connections 112-2 and 114-1. This process continues until all six pairs have been tried and by then processing unit 201 has network performance information of these six pairs. The network performance information may be stored in main memory 202 or/and secondary storage 204 for further processing.

Alternatively, a policy for selecting WAN interfaces of node 106 and node 108 is to select WAN interfaces that are connected to a wireless access network. As wireless access networks may have more fluctuating network performance, network administrator may want to find out which wireless access network should be used more frequently. Therefore, network performance of WAN interface pair through wireless access networks should be estimated more frequently. Processing unit 201 determines which WAN interface(s) of node 106 are connected to wireless access network(s). Those skilled in the arts would know that there are many ways for determining which WAN interfaces are connected to wireless access networks. For example, in Linux command line interface, the command "iwconfig" can be used for determining which WAN interfaces are connected to wireless access networks. For illustration purpose, WAN interfaces 121-1 and 121-2 are connected to a first and a second wireless access network respectively. Processing unit 201 further determines to send a first message to node 108 in order to receive information about which WAN interface(s) of node 108 are connected to a wireless access network. When node 108 receives the first message, node 108 sends a second message to node 106 with information about which WAN interface(s) of node 108 are connected to wireless access network(s). For example, both WAN interfaces 122-1 and 122-2 are connected to a third wireless access network. After receiving the second message, processing unit 201 is able to determine that WAN interfaces 122-1 and 122-2 are connected to the third wireless access network, and therefore selects WAN interfaces 121-1 and 121-2 of node 106 for transmitting reference packets to WAN interfaces 122-1 and 122-2 of node 108. Thus, processing unit 201 estimates the network performance of four WAN interface pairs: 121-1 and 122-1, 121-1 and 122-2, 121-2 and 122-1, 121-2 and 122-2. For example, network performance of the WAN interface pair 121-1 and 122-1 is estimated by transmitting reference packets from WAN interface 121-1 to WAN interface 122-1. The network performance information may then be stored in secondary storage 204 and/or main memory 202.

According to one of the embodiments of the present invention, a policy for selecting WAN interfaces of node 106 and node 108 is to select all WAN interfaces of node 106 and node 108 at the same time. Processing unit 201 of node 106 sends reference packets through all of WAN interfaces 121 to all WAN interfaces 122 of node 108. The reference packets can be sent as soon as possible. For example, initially, processing unit 201 sends reference packets through WAN interfaces 121-1, 121-2 and 121-3 substantially at the same time to WAN interface 122-1. Processing unit 201 sends reference packets through WAN interfaces 121-1, 121-2 and 121-3 substantially at the same time to WAN interface 122-2. This policy may allow the network performance to be estimated in a short period of time as all WAN interfaces are being used substantially at the same time. However, the number of reference packets being sent may overwhelm processing unit 201 and/or congest access networks.

Alternatively, the policy is to select all WAN interfaces of node 106 and node 108 at the same time but avoiding sending reference packets destined to the same WAN interface of node 108 and through the same WAN interface of node 106 substantially at the same time. For example, initially, processing unit 201 sends reference packets through WAN interface 121-1 to WAN interface 122-1 and reference packets through WAN interface 121-2 to WAN interface 122-2 substantially at the same time. Then processing unit 201 sends reference packets through WAN interface 121-1 to WAN interface 122-2 and reference packets through WAN interfaces 121-3 to WAN interface 122-1 substantially at the same time. Finally, processing unit 201 sends reference packets through WAN interfaces 121-2 to WAN interface 122-1 and reference packets through WAN interfaces 121-3 to WAN interface 122-2 substantially at the same time. This policy allows estimation of network performance while reducing the possibility of congesting reference packets at a sending WAN interface or at a destined WAN interface. Therefore, the policy or the algorithm for selecting end-to-end connection(s) or WAN interface pair(s) should avoid overwhelming computing resources and/or network resources when performing the estimation. In one variant, when the purpose is to identify the capacity of computing resources and/or network resources, it is desirable to overwhelm computing resources and/or network resources.

In one variant, when selecting WAN interface pairs or end-to-end connections for estimating network performance, the policy or algorithm should be similar or the same as when WAN interface pairs or end-to-end connections are selected when regular data traffic are being transmitted or received. For example, the policy or algorithm should be based on the end-to-end connection profile or aggregated end-to-end connection profile.

Alternatively, as there are three WAN interfaces at node 106, there are seven combinations of WAN interfaces that can be used. Similarly, as there are two WAN interfaces at node 108, there are three combinations of WAN interfaces that can be used. As seven times three is equal to twenty-one, there are twenty-one combinations of WAN interface pairs. The equation to calculate the number of possible end-to-end connections in an end-to-end connection profile is $(2^M-1) \times (2^N-1)$, where M is the number of WAN interfaces at node 106 and N is the number of WAN interfaces at node 108. For example, as illustrated in table 801 of FIG. 8, in Row1, network performance of one end-to-end connection is estimated by using the WAN interface pair 121-1 and 122-1. In Row7, three WAN interfaces 121-1, 121-2 and 122-1 are being used, and network performance of at least two end-to-end connections is estimated by using WAN interface pair 121-1 and 122-1, and WAN interface pair 121-2 and 122-1. The network performance estimated can be an average, a maximum, a minimum, a sum or other statistical information of the network performance of the at least two end-to-end connections. In a preferred embodiment, the network performance estimated is the average of the network performance of the at least two end-to-end connections. The at least two end-to-end connections may or may not be aggregated. In Row 13, four WAN interfaces 121-1, 121-2, 121-3 and 122-1 are being used and network performance of at least three end-to-end connections is estimated by using WAN interface pair 121-1 and 122-1, WAN interface pair 121-2 and 122-1, and WAN interface pair 121-3 and 122-1. In Row18, four WAN interfaces 121-1, 121-2, 122-1 and 122-2 are being used and network performance of at least four end-to-end connections is estimated by using WAN interface pair 121-1 and 122-1, WAN interface pair 121-2 and 122-1, WAN interface pair 121-1 and 122-2, and WAN interface pair 121-2 and 122-2. In Row21, five WAN interfaces 121-1, 121-2, 121-3, 122-1 and 122-2 are being used and network performance of at least six end-to-end connections is estimated by using WAN interface pair 121-1 and 122-1, WAN interface pair 121-2 and 122-1. WAN interface pair 121-3 and 122-1, WAN interface pair 121-1 and 122-2, WAN interface pair 121-2 and 122-2 and WAN interface pair 121-3 and 122-2.

In this way, each of the twenty-one combinations of WAN interface pairs is used for transmitting reference packets and the corresponding network performance is estimated as illustrated in the throughput column, packet loss column and RTT column of table 801 of FIG. 8. There is no limitation of what network performance information can be displayed and the representation of the network performance information. For example, packet jitter, end-to-end connection setup time, frequency of out-of-order packet arrival and other information can be displayed as rows or columns in table format, or using other data visualization techniques. In one variant, network performance information is mainly based on arrival information and transmittal information such as CPU usage of nodes 106 and 108 while transmitting and receiving reference packets respectively, number of bytes transmitted by node 106 over a specific time period, number of bytes received by node 108 over the specific time period, duration over which reference packets are transmitted, duration over which reference packets are received, number of reference packets that were retransmitted, and round trip time.

In one of the embodiments, not all of the twenty-one combinations of WAN interfaces are used for estimating the network performance of end-to-end connection(s) formed by the combinations respectively. For example, as illustrated in table 901 of FIG. 9, only a subset of five combinations out of the twenty-one combinations of WAN interfaces are selected for estimating network performance of end-to-end connection(s) established through the five combinations of WAN interfaces. The five combinations of WAN interfaces are selected by the user or according to a policy. The advantage of not estimating network performance of end-to-end connections formed by all twenty-one combinations of WAN interfaces, and instead estimating network performance of end-to-end connections formed by the five combinations of WAN interfaces, is that the network performance estimation takes less time to finish. However, if network performance of end-to-end connections formed by all twenty-one combinations of WAN interfaces is not estimated, node 106 does not have adequate information to determine accurately which combination of WAN interfaces forms an end-to-end connection with the best network performance.

According to one of the embodiments of the present invention, when there is a plurality of end-to-end connection profiles at node 106, the network performance estimation is performed for all the end-to-end connection profiles. For example, there are two end-to-end connections belonging to a first end-to-end connection profile and five end-to-end connections belonging to a second end-to-end connection profile, processing unit 201 perform network performance estimation for all the seven connections. Therefore, the administrator of node 106 can be aware of the network performance information of end-to-end connections of all aggregated end-to-end connections. In one variant, when an end-to-end connection appears in more than one end-to-end connection profile, the network performance estimation for the end-to-end connection is only performed once in order to save time. In one variant, when a WAN interface pair appears in more than one end-to-end connection profile, processing unit 201 will first determine if the configurations to establish corresponding end-to-end connections are the same in the more than one end-to-end connection profiles. If the configurations are the same, then there is no need to conduct the network performance estimation for the WAN interface pair repeatedly. However, if the configurations are not the same, then network performance estimation will be performed for the corresponding end-to-end connections because the corresponding end-to-end connections may be established differently and the configuration may affect the network performance.

According to one of the embodiments of the present invention, not all WAN interfaces of node 106 and node 108 are selected for estimating network performance. This is because the time to complete the estimation of all WAN interface pairs could be too long. For example, after processing unit 201 of node 106 has taken one minute to estimate network performance between WAN interface 121-1 and WAN interface 122-1 by sending reference packets from WAN interface 121-1 to WAN interface 122-1, it is very possible that it will take about five minutes to estimate network performance of the remaining five pairs. Therefore the total time required to estimate network performance is about six minutes. This could be too long for an administrator of node 106 and/or node 108. Therefore, in one variant, the administrator is able to select one or more WAN interfaces 121 and/or one or more WAN interfaces 122 for estimating network performance. In one variant, only a predefined number of WAN interface pairs are used for estimating network performance. The preferred predefined number of WAN interface pairs is between one to ten.

In one variant, processing unit 201 tries to estimate network performance of as many WAN interface pairs as possible within a time period. For example, the length of the time period is three minutes and processing unit 201 stops sending reference packets through the WAN interface pairs after three minutes. For illustration purpose, if within these three minutes, processing unit 201 is able to estimate network performance of WAN interface pair 121-1 and 122-1, 121-2 and 122-2, and 121-3 and 122-1, processing unit 201 will not attempt to send reference packets through the remaining WAN interface pairs, namely WAN interface pairs 121-2 and 122-1, 121-1 and 122-2, and 121-3 and 122-2. Therefore, processing unit 201 will not estimate network performance of WAN interface pairs 121-2 and 122-1, 121-1 and 122-2, and 121-3 and 122-2. The time-period can be predefined in a policy and/or as a parameter in an algorithm. In one variant, the length of time-period allowed for estimating network performance is different during different hours of the day or different days of the week. For example, during office hour the length of time-period is one minute, but during non-office hour, the length of time-period is ten minutes. In another example, during operation hour, no estimation of network performance is allowed, but during scheduled maintenance, there is no limitation of the time-period. In one variant, when a time period is specified for estimating network performance, processing unit 201 determines an order in which network performance of WAN interface pairs should be estimated according to priorities assigned to the WAN interface pairs. For example, WAN interface pairs 121-1 and 122-1, 121-3 and 122-2, 121-2 and 122-1, 121-3 and 122-1, 121-2 and 122-2, 121-1 and 122-2, are assigned with a first priority, second priority, third priority, fourth priority, fifth priority and sixth priority respectively. Therefore, reference packets are first sent through WAN interface pair 121-1 and 122-1, then through WAN interface pair 121-3 and 122-2, and so on. If the length of the time period is four minutes, processing unit 201 transmits reference packets through WAN interface pairs in order of the priorities assigned for four minutes. The network performance estimation may or may not have been completed within the four minutes. If the network performance estimation is not completed or partially completed, the network performance information is only partial. The partial network performance information does not offer accurate estimation comparing to the complete network performance information. However, as processing unit 201 is instructed to stop after four minutes, processing unit 201 may only be able to produce partial network performance information. Additionally, priorities can also be assigned to combinations of end-to-end connections. Reference packets are transmitted through the combinations of end-to-end connections that have higher priority. The priorities may be assigned manually by the user or according to a policy.

According to one of the embodiments of the present invention, the estimation of network performance begins when node 106 receives an instruction. The use of an instruction is to allow programmability and flexibility of the process of network performance estimation. The instruction can be preset in the configuration file, received from a user, received from a node or host, triggered by an input in node 106, and/or triggered by a network condition. For example, an instruction saved in the configuration file is to begin the process of estimating network performance six o'clock in the morning.

According to one of the embodiments of the present invention, the reference packets contain information to assist the receiving node to generate arrival information. The information may include timestamp, sequence number, and end-to-end connection identity if the reference packets are sent through one or more end-to-end connections. Such information may be required for estimating the network performance experienced by the reference packets. For example, the sequence number is used for arranging the reference packets in the correct order because if the reference packets are transmitted through different end-to-end connections, they may arrive at node 108 out of order. The timestamp can be used for determining the time at which the reference packet was transmitted, and hence the arrival information can include the time period passed between transmitting and receiving. When the reference packets are transmitted through more than one end-to-end connections, the end-to-end connection identity specifies which end-to-end connection each reference packet was received through. The end-to-end connection identity and timestamp corresponding to the reference packets may together be used to identify which end-to-end connections can carry reference packets the fastest. The receiving node, for example, stores the timestamp retrieved from the reference packets in the arrival information. Similarly, the receiving node may store sequence number, end-to-end connection identity and/or in the arrival information.

According to one of the embodiments of the present invention illustrated in FIG. 4, processing unit 201 of node 106 estimates network performance of at least one end-to-end connection, which is established using one WAN interface pair, such as WAN interface pair 121-1 and 122-1. At step 401, processing unit 201 selects at least one end-to-end connection. Then at step 402, processing unit 201 sends reference packets to node 108 through the at least one end-to-end connection. At step 403, processing unit 201 receives arrival information corresponding to the reference packets from node 108. At step 404, processing unit 201 estimates network performance of the at least one end-to-end connection according to the received arrival information.

When an end-to-end connection is being selected at step 401, the selection can be performed by a user's manual input, an administrator's manual input, a policy, an algorithm, or a configuration file. An end-to-end connection may be given a name or an identity. Therefore, when selecting an end-to-end connection, the end-to-end connection can be selected by its name, identity or its corresponding WAN interface pair. For example, the end-to-end connections between WAN interface pairs 121-2 and 122-2, and 121-3 and 122-1 are named as "Paris" and "London" respectively. Then at step 401, the administrator of node 106 can select "Paris" in a web based user-interface for estimating the network performance. Similarly, a policy can be predefined to estimate network performance of both end-to-end connections "Paris" and "London" and the policy is being stored as a file or program instructions in secondary storage 204 or main memory 202.

In one variant, an end-to-end connection profile is used to configure at least one end-to-end connection and end-to-end connections belonging to the end-to-end connection profile are selected for estimating network performance. To those skilled in the art, a virtual private network (VPN) profile can be considered as an end-to-end connection profile. In the end-to-end connection profile, the settings or configurations for establishing at least one end-to-end connection profile are detailed. The end-to-end connection profile can be stored in secondary storage 204 or main memory 202 as a file or program instructions. An administrator can select the end-to-end connection profile for network performance estimation, then processing unit 201 selects the at least one end-to-end connection specified by the end-to-end connection profile for network performance estimation at step 401.

For example, an end-to-end connection profile specifies source and destination devices, such as node 106 and node 108 respectively, WAN interfaces selected for the end-to-end connections, the encryption standard of the end-to-end connection, and any key required to gain access to the end-to-end connections. For illustration purposes, WAN interfaces 121-1 and 121-3 of node 106 and WAN interface 122-2 are specified in the end-to-end connection profile. The encryption standard is specified as AES 128. Therefore, a first end-to-end connection between network interface pair 121-1 and 122-2, and a second end-to-end connection between network interface pair 121-3 and 122-2 are configured according to the end-to-end connection profile. Processing unit 201 then estimates the network performance of at least one of the first and second end-to-end connections.

According to one of the embodiments of the present invention illustrated in FIG. 5, processing unit 201 of node 106 selects a plurality of end-to-end connections at step 501. At step 502, processing unit 201 transmits reference packets through at least two of the plurality of end-to-end connections substantially at the same time. Comparing to transmitting reference packets through only one of the plurality of end-to-end connections, transmitting reference packets through at least two of the plurality of end-to-end connections substantially at the same time allows the estimation of network performance to be completed quicker and able to observe whether network traffic in one end-to-end connection affects network performance in another end-to-end connection.

At step 503, processing unit 201 receives arrival information from node 108. The arrival information can be sent by node 108 through an end-to-end connection, a plurality of end-to-end connection, or connectionless data transmission method. Therefore, the source IP address of the arrival information belongs to the IP address(es) of one or more WAN interfaces of node 108. At step 504, processing 201 is able to estimate network performance of the end-to-end connection according to the received arrival information.

For example, viewing in conjunction with FIG. 1B, a plurality of end-to-end connections 116 established between node 106 and node 108 is selected in step 501. The plurality of end-to-end connections comprise a first, second, third, fourth, fifth and sixth end-to-end connection that are established between WAN interface pairs 121-1 and 122-1, 121-1 and 122-2, 121-2 and 122-1, 121-2 and 122-2, 121-3 and 122-1, and 121-3 and 122-2, respectively. In step 501, the plurality of end-to-end connections are selected. In step 502, processing unit 201 transmits reference packets through at least two of the plurality of end-to-end connections, such as the first and second end-to-end connections, substantially at the same time. Arrival information corresponding to the reference packets is generated by node 108 and sent to node 106. Node 106 receives the arrival information in step 503 and processing unit 201 is able to estimate the network performance of the first and second end-to-end connections based on the arrival information in step 504. In one variant, one or more end-to-end connections may be established between each WAN interface pair. For example, WAN interface 121-1 can establish more than one end-to-end connection with WAN interface 122-1.

According to one of the embodiments of the present invention illustrated in FIG. 6, after processing unit 201 estimates network performance of the at least two end-to-end connections in step 504, processing unit 201 determines in step 605 whether network performance of all of the plurality of end-to-end connections has been estimated. If network performance of all of the plurality of end-to-end connections has not been estimated, processing unit 201 performs step 502 by transmitting reference packets through another at least two of the plurality of end-to-end connections and estimates the network performance of the another at least two end-to-end connections in step 504 after receiving arrival information in step 503. If processing unit 201 determines in step 605 that network performance of all of the plurality of end-to-end connections has been estimated, the network performances are compared by processing unit 201 in step 606. After comparison, at least two of the plurality of end-to-end connections is selected, mainly based on the network performance, for forming an aggregated end-to-end connection in step 607. The selection is preferably based on bandwidth availability determined according to network performance information collected during the network performance estimation. Alternatively, the selection is based on latency and end-to-end connections having latency less than a threshold are selected. The latency information is found during the network performance estimation.

In one variant, processing unit 201 determines to estimate network performance of some of the plurality of end-to-end connections, and not all of the plurality of end-to-end connections. Therefore, in step 605, processing unit 201 determines whether the estimation of network performance of the some of the plurality of end-to-end connections has been completed. The determination as to which end-to-end connections belong to the some of the plurality of end-to-end connection is based, at least in part, on a policy.

In one variant, an aggregated end-to-end connection profile specifies end-to-end connections that may be used for forming an aggregated end-to-end connection. For example, the aggregated end-to-end connection profile specifies the first, second, third and fourth end-to-end connections that can be used to form an aggregated end-to-end connection. Network performance of at least two end-to-end connections, such as the first and second end-to-end connections is estimated in step 504. In step 605, processing unit 201 determines whether the network performance of all of the first, second, third and fourth end-to-end connections have been estimated. If it is determined that the network performance of all of the first, second, third and fourth end-to-end connections have been estimated, their network performances are compared in step 606. If it is determined that the network performance of the third and fourth end-to-end connections have not been estimated, step 502 is performed by transmitting reference packets through the third and fourth end-to-end connections and thus their network performance is estimated in step 504.

In one variant, network performance of end-to-end connections specified in an aggregated end-to-end connection profile is estimated within a time period. Within the time period, processing unit 201 estimates the network performance of as many end-to-end connections as possible. When the time period is over, processing unit 201 does not estimate the network performance of anymore end-to-end connections, even if the network performance of all end-to-end connections specified in the aggregate end-to-end connection profile has not been estimated. The time period can be predefined by the manufacturer of the network node, entered by a user or administrator of the network node or retrieve from a remote server.

In one of the embodiments of the present invention, when reference packets are transmitted through at least two end-to-end connections in step 502, processing unit 201 determines which at least two end-to-end connections should be used to transmit reference packets at substantially the same time based on the WAN interface pairs forming the end-to-end connections. No two end-to-end connections using a same WAN interface will be used to transmit reference packets at substantially the same time. For example, if a first end-to-end connection is formed between WAN interface 121-1 and WAN interface 122-1, and a second end-to-end connection is formed between WAN interface 121-1 and WAN interface 122-2, reference packets are not transmitted through the first and second end-to-end connections at substantially the same time because both of them use WAN interface 121-1. This is to avoid congesting WAN interface 121-1 and/or the corresponding access network which may result in inaccurate network performance estimation. In one variant, processing unit 201 determines which at least two end-to-end connections should be used to transmit reference packets at substantially the same time according to a predefined policy.

In one variant, results of the network performance estimation are reported to the user by processing unit 201 by sending a message containing network performance information to a predefined destination. The message can be an email, an instant message, a short message service (SMS), a phone call, a message shown in a web page, a popup message at a web page, and other indicators that can be used to report the network performance to the user. A predefined destination can be an email address, an IP address, a LED display, a speaker, a screen, a console, a network node, a host, a mobile phone, a laptop and any electronic device that can receive the message. In another variant, processing unit 201 only sends a message to the user when there is an unusual drop in network performance of any WAN interface pair or end-to-end connection. For example, network performance of a first end-to-end connection deteriorates significantly over a short period of time. Processing unit 201 detects this significant drop in the network performance of the first end-to-end connection and sends a message reporting the network performance information to the user. The message can be an email, an instant message, a short message service (SMS), a phone call, a message shown in a web page, a popup message at a web page, an alarm, a sound, a blinking light, a light-emitting diode (LED) being turned on and other indicators that can be used to indicating that there is a significant drop in the network performance of one of the end-to-end connections being used for transmitting data.

According to one of the embodiments of the present invention illustrated in FIG. 7A, at least one end-to-end connection is used for transmitting data packets after the at least one end-to-end connection is selected. At step 701, processing unit 201 receives network performance information corresponding to a plurality of end-to-end connections. The network performance information may be retrieved from main memory 202 and/or secondary storage 204. The network performance information is generated by processing unit 201 at step 306, 404 or 504. At step 702, processing unit 201 selects at least one end-to-end connection substantially based on the network performance information. Then at step 703, processing unit 201 transmits and receives data packets through the at least one end-to-end connection selected.

In one variant, the network performance information is first retrieved from a remote server or a remote network node, and then stored in from main memory 202 and/or secondary storage 204 before being used by processing unit 201.

According to one of the embodiments of the present invention illustrated in FIG. 7B, similar to flowchart shown in FIG. 7A, processing unit 201 selects end-to-end connections that have satisfied a certain selection criteria according to the network performance information. The end-to-end connections selection criteria are retrieved at step 711. For example, if the selection criterion is that latency is less than 50 milliseconds, then processing unit 201 only selects end-to-end connections that have latency less than 50 milliseconds. If there is no end-to-end connection according to the network performance information that has latency less than 50 milliseconds, then processing unit 201 does not select any end-to-end connection. In one variant, when there is no end-to-end connection satisfying the selection criteria according to the network performance information, processing unit 201 selects one end-to-end connection that performs the best according to the network performance information.

In another example, the selection criteria is that packet drop rate should not be more than five data packets in five seconds and bandwidth available should be more than 2 Mbps.

The selection criteria can be stored in main memory 202, secondary storage 204, a remote server or a remote node. The selection criteria can be stored in the form of program instructions, files, configuration, strings or computer readable information.

At step 712, processing unit 201 seeks confirmation whether the end-to-end connections are selected for transmitting data packets. The confirmation can be received in many forms, such as entered by an administrator, received from a user, defined by a policy stated in a configuration file, etc.

At step 713, a message is sent by processing unit 201 to inform that the selected end-to-end connections are about to be use to transmit and receive data packets. Depending on the configuration, the message can be sent in many forms, such as email, screen popup, screen message, instant message, SMS or etc. The message can also be sent to one or a plurality of receivers, such as an administrator, user, remote server, management console, etc. The main purpose of steps 712 and 713 is to confirm that selected end-to-end connections are to be used. This confirmation may reduce the possibility of selecting one or more wrong end-to-end connections and allow a user to override the end-to-end connection selection at step 702.

At step 703, those skilled in the arts would appreciate that the data packets can be IP packets that are transmitted and received using Transmission Control Protocol (TCP), User Datagram Protocol (UDP), Real-time Transport Protocol (RTP), Layer 2 Tunnelling Protocol (L2TP) or other communications protocol. Although some of the protocols, such as UDP, by design are connectionless, processing unit 201 can still use UDP and Internet Protocol Security (IPSec) to provide end-to-end connection.

According to one of the embodiments of the present invention illustrated in FIG. 7C, similar to flowchart shown in FIG. 7A. Processing unit 201 selects end-to-end connections that have satisfied a certain selection criteria according to the network performance information. The end-to-end connections selection criteria are retrieved at step 711. At step 721, processing unit 201 selects at least two end-to-end connections substantially based on the network performance information. At step 721, processing unit 201 aggregates the selected at least two end-to-end connections to form one aggregated end-to-end connection. Then at step 723, processing unit 201 transmits and receives data packets through the aggregated end-to-end connection.

The benefits of using aggregated end-to-end connections are known to those skilled in the art, such as failover, more bandwidth and etc. Depending on the selection criteria, end-to-end connections with significant difference in network performance can be aggregated together. Similarly, selection criteria may only allow selection of end-to-end connections that have network performance within a threshold to form the aggregated end-to-end connection.

Displaying of Network Performance Information

According to one of the embodiments of the present invention illustrated in FIG. 8, network performance information of end-to-end connections belonging to an aggregated end-to-end connection profile is displayed in table 801. Node 106 and node 108 may have an internal display integrated into their system which may comprise an LCD display, LED display, LED buttons or screen. The network performance information can be displayed by processing unit 201 on the internal display of node 106 and/or node 108. Alternatively, viewing in conjunction with FIG. 10, the network performance information can also be displayed in an external display, such as display 1001 which can be connected to node 106 and/or node 108 through network 110. Display 1001 can be a laptop, a handheld computer device, a desktop, or a mobile phone that receives the network performance information from one or more nodes that perform the network performance measurement. Alternative to the embodiment illustrated in FIG. 10, display 1001 may be connected directly to node 106 and not through network 110. Alternatively, display 1001 may be connected directly to node 108 and not through network 110. In one variant, the network performance information is displayed in more than one internal or external displays. The network performance information can also be presented to a user in the form of voice, sound and alerts in node 106, node 108, and/or an external display such as display 1001.

Display 1001 retrieves the network performance information from a storage unit. The storage unit can be located in the one or more nodes that perform the network performance measurement, such as node 106 or 108. In an example, the network performance information is stored in secondary storage 204 and is retrieved by display 1001 from secondary storage 204. Therefore, the network performance information may be stored in the same storage unit that stores program instructions executable by processing unit 201. Alternatively, viewing in conjunction with FIG. 10, the storage unit, such as storage unit 1002 is located in one or more computer, nodes, or servers that received the network performance information from node 106 or node 108. For example, when node 106 estimates the network performance, it stores the network performance information in storage unit 1002. Alternative to the embodiment illustrated in FIG. 10, storage unit 1002 may be connected directly to node 106 and not through network 110. Alternatively, storage unit 1002 may be connected directly to node 108 and not through network 110. In one variant, the network performance information is stored in more than one storage unit.

In one of the embodiments, the user selects end-to-end connections based on the network performance information that is displayed in the internal display of node 106 or 108, or display 1001. In one variant, the internal display of node 106 or 108 also comprises buttons, knobs, touch-screen, sound receiver with voice recognition system, or any module that can be used for receiving the selection of the user. Alternatively, the user selects end-to-end connections remotely through a web interface, an application programming interface, a command line interface or a console that may or may not be displayed on display 1001.

The network performance information is retrieved from a storage unit. The storage unit can be located in the one or more nodes that perform the network performance measurement or in one or more computer, nodes, servers that stored the network performance information.

There are five WAN interfaces shown in table 801 of FIG. 8: WAN interfaces 121-1, 121-2 and 121-3 of node 106 and WAN interfaces 122-1 and 122-2 of node 108. Therefore, there are five columns representing these five WAN interfaces. Circles are used to indicate the identities of the WAN interface that the network performance information belongs to. For example, in Row8, there are circles placed in the columns WAN interface 121-1. WAN interface 121-3 and WAN interface 122-1. This indicates that two end-to-end connections are established for the WAN interface pairs: WAN interfaces 121-1 and 122-1, and WAN interfaces 121-3 and 122-1. The average total throughput using these two end-to-end connections is 53.67 Mbps. There is no packet loss during the network performance measurement and the average round-trip time (RTT) is 3.15 milliseconds for IP packets being transmitted in these two end-to-end connections. In one alternative, these two end-to-end connections are aggregated together to form one aggregated end-to-end connection. The network performance measurement displayed is the measured through the aggregated end-to-end connection.

In another example, in Row 14, there are circles placed in the columns WAN interface 121-1, WAN interface 121-2, WAN interface 121-3 and WAN interface 122-2. This indicates that three end-to-end connections are established for the WAN interface pairs: WAN interfaces 121-1 and 122-2, WAN interfaces 121-2 and 122-2, and WAN interfaces 121-3 and 122-2. The minimum throughput using these three end-to-end connections is 86.50 Mbps. The packet loss during the network performance measurement is 10% and the average round-trip time (RTT) is 3.67 milliseconds for IP packets being transmitted in these two end-to-end connections. The value in the throughput column may indicate the average throughput, minimum throughput, maximum throughput, or sum of the throughputs of the end-to-end connections being used for transmitting reference packets.

There are twenty-one rows displayed, not including the header row, because there are twenty-one combinations of end-to-end connections whose network performance can be estimated in the aggregated end-to-end connection profile. As there are three WAN interfaces at node 106, there are seven combinations of WAN interfaces that can be used. Similarly, as there are two WAN interfaces at node 108, there are three combinations of WAN interfaces that can be used. As seven times three is equal to twenty-one, there are twenty-one combinations of end-to-end connections. The equation to calculate the number of possible combinations of end-to-end connections is $(2^M-1)\times(2N-1)$, where M is the number of WAN interfaces at the first node and N is the number of WAN interfaces at the second node, while the number of possible end-to-end connections is M×N.

As the number of end-to-end connections increases exponentially with the number of WAN interfaces, the number of end-to-end network performance estimations required also increases exponentially. This is why a policy is required to choose some but not all end-to-end network connection for performing the estimation. On the other hand, if time permits, a complete end-to-end network performance estimations is preferred as all network performance information will then be made available. If all network performance information is available, a user may not want to have all network performance information displayed as the user may only be interest in some of the network performance information.

According to one of the embodiments of the present invention, in an aggregated end-to-end connection profile, a policy for selecting WAN interfaces to establish end-to-end connections is to have as many end-to-end connections as possible and network performance of each end-to-end connection has to satisfy a threshold.

In one of the embodiments, as illustrated in table 901 of FIG. 9, network performance information of a subset of the twenty-one combinations of end-to-end connections is retrieved. Five combinations out of the twenty-one combinations of end-to-end connections are displayed in Row 1 to Row5. The five combinations of end-to-end connections are selected by the user or according to a policy. Therefore the network performance information of the five combinations of end-to-end connections is displayed in the throughput column, packet loss column and RTT column of table 901 in FIG. 9.

According to one of the embodiments of the present invention, the selection of WAN interface pairs corresponding to an aggregated end-to-end connection profile for displaying network performance information is based on a policy. The main role of this policy is to instruct processing unit 201 how to select WAN interface pairs. The policy can be in the form of program instructions stored in secondary storage 204 or main memory 202. Alternatively the policy can be first stated in a configuration file stored in secondary storage 204 and then interpreted by a program or program instructions for processing unit 201.

According to one of the embodiments of the present invention, a policy for displaying network performance information is to select end-to-end connections, i.e. WAN interface pairs, whose network performance meets a certain threshold. For example, the policy to display network performance information is to display end-to-end connections whose packet loss percentage is less than 10%. End-to-end connections whose packet loss percentage is equal to or above 10% will not be displayed. This allows a user to focus on end-to-end connections that meet the threshold. In one variant, the end-to-end connections corresponding to an aggregated end-to-end connection profile. Therefore network performance information, corresponding to end-to-end connections that do not belong to the aggregated end-to-end connection profile, is not displayed.

According to one of the embodiments of the present invention, network performance information corresponding to WAN interface pairs is displayed according to a user's selection and the WAN interface pairs corresponding to an aggregated end-to-end connection profile. As in an end-to-end connection profile there could be many end-to-end connections or WAN interface pairs, the amount of network performance information could be huge. A user may only be interested in network performance information only corresponding to certain end-to-end connections or WAN interface pairs. A user selects the end-to-end connections through a user interface. Then network performance information corresponding to the selected end-to-end connections is then shown to the user.

In one variant, an end-to-end connection is provided with an identity for easy reference. For example, an end-to-end connection is labelled as "Toronto-Seattle". Then when network performance information is displayed, the identity "Toronto-Seattle" is displayed. In one variant, the serial number of the node and the WAN interface number are used together as the identity. When displaying the identities of WAN interface pairs of an end-to-end connection, the serial number and WAN interface number of node 106 and serial number and WAN interface number of the node 108 are displayed. In one variant, a network node has three WAN interface and the identities of WAN interfaces are "WAN-1", "WAN-2" and "WAN-3" respectively. In one variant. IP address of the WAN interfaces are used as the identities. In one variant, host name of the WAN interfaces are used as the identities.

According to one of the embodiments of the present invention illustrated in FIG. 11, network performance information is displayed using a bar chart. Individual throughputs of a first, a second, a third, a fourth, and a fifth end-to-end connection are displayed on bar chart 1101. Furthermore, the throughput of a first aggregated end-to-end connection, formed by aggregating the first, second, third, fourth and fifth end-to-end connections, is also displayed on bar chart 1101. The horizontal axis of bar chart 1101 represents the end-to-end connection identity, and the vertical axis of bar chart 1101 represents the throughput corresponding to each end-to-end connection identity. For example, the throughput corresponding to the first end-to-end connection is 52.03 Mbps as indicated by bar 1103. Similarly, bars 1104, 1105, 1106 and 1107 indicate the throughputs of the second, third, fourth and fifth end-to-end connections respectively. Line 1102 indicates the value of the average network performance of the aggregated end-to-end connection. For example, in this illustration, the average total throughput is 49.09 Mbps as the value indicated by the vertical axis at the position of line 1102 is 49.09 Mbps. A similar bar chart can be generated for other network performance information, and is not limited to displaying only the throughput of end-to-end connections. Furthermore, line 1102 may indicate the maximum, minimum, variance of the network performance or other statistical information of the network performance.

According to one of the embodiments of the present invention, a message is sent to a user when network performance information is displayed. The message may alert the user that the network performance information displayed is a subset of network performance information available; may provide suggestion to the user which end-to-end connections should be used and which end-to-end connections should not be used; may inform the user that some of the network performance values are not desirable; may inform the users the conditions when to use one or more end-to-end connections.

The message can be an email, an instant message, a short message service (SMS), a phone call, a message shown in a web page, a popup message at a web page, data transmitted in simple network management protocol (SNMP), in data transmitted in extensible markup language (XML) format and other indicators that can be used to deliver the message. The nature of the message includes warning message, help message and suggestion message and reminder message. The conditions, policies or criteria to send the message can be stored in a configuration file. The configuration file can be stored in secondary storage 204 or main memory 202.

For example, a warning message is displayed when there is an unusual drop in network performance of any WAN interface pair or end-to-end connection that is being used for transmitting data packets. A first end-to-end connection is being used by node 106 for transmitting data packets to node 108. Therefore, when network performance of the first end-to-end connection deteriorates significantly over a short period of time, the warning message is displayed and used to warn the user that the first end-to-end connection may fail anytime because a significant drop has been detected in the performance of the first end-to-end connection.

A help message may be displayed to assist the user in using the user interface to perform various functions, or for explaining the user the significance of each item displayed. The various functions the user interface can be used to perform include, but is not limited to, selecting end-to-end connections or WAN interface pairs for transmitting data packets, selecting aggregated end-to-end connection profiles or end-to-end connection profiles whose network performance information should be displayed, selecting WAN interface identities that should be displayed, and the type of network performance information that should be displayed.

A suggestion message is displayed to suggest the user on which end-to-end connections should be selected for transmitting data packets in order to achieve the best network performance. The suggestion message is based on the network performance information that is retrieved and displayed. The suggestion message may summarize which end-to-end connections provide the best network performance and worst network performance. For example, the network performance information indicates that while using a first and second end-to-end connection, the throughput is 80 Mbps and packet drop rate is 0%. Processing unit 201 determines that the network performance of the combination of the first and second end-to-end connection to be the best among all other combinations of end-to-end connections. Therefore, the suggestion message suggests the user to select the first and second end-to-end connections for transmitting data packets for achieving the best network performance. The user may or may not select end-to-end connections based on the suggestion message.

A reminder message may be displayed to remind the user about certain changes in network performance that may happen at a certain time. For example, based on historical network performance information, processing unit 201 determines that every Sunday at 10:30 pm, the network performance drops significantly when a first end-to-end connection is being used. This may happen due to bandwidth throttling set by the ISP providing the network for the first end-to-end connection. The reminder message can be displayed an hour before 10:30 pm on Sundays in order to remind the user to select any other end-to-end connection for transmitting data packets instead of the first end-to-end connection. Alternatively, a reminder message reminds the user about peak or off-peak hours which may affect the network performance or usage price, and hence the user may want to change the selection of end-to-end connection based on the reminder message.

BRIEF DESCRIPTION OF DRAWINGS

FIG. 8 illustrates a table for displaying network performance information according to one of the embodiments;

Figure 1A:
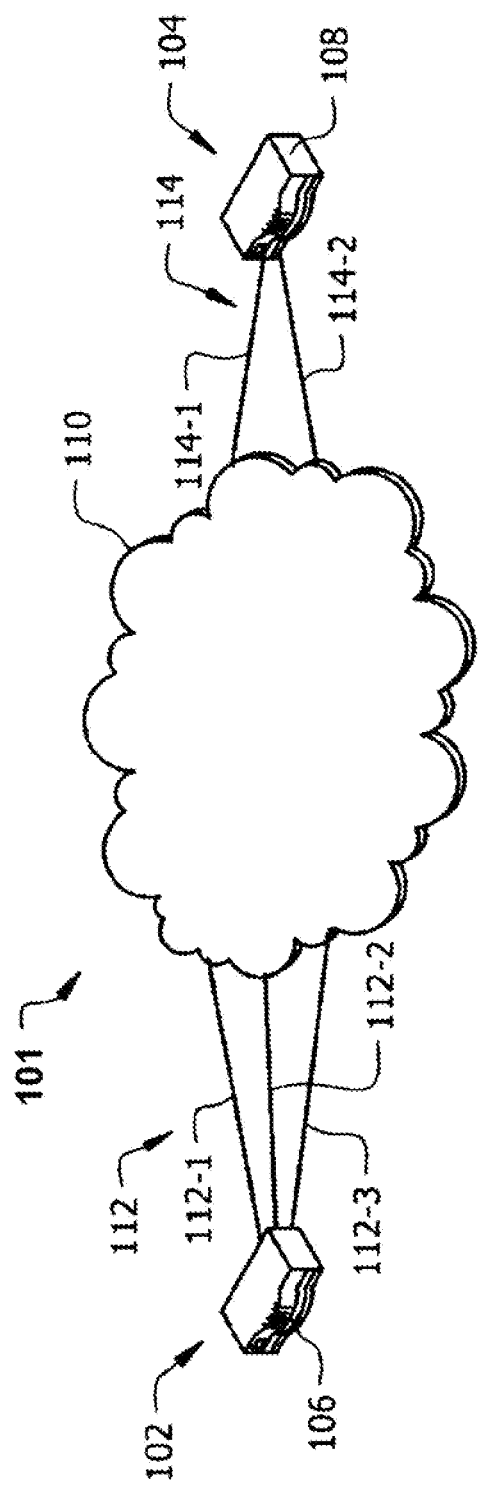
FIG. 1A illustrates a network environment according to one of the embodiments.
Figure 1B:
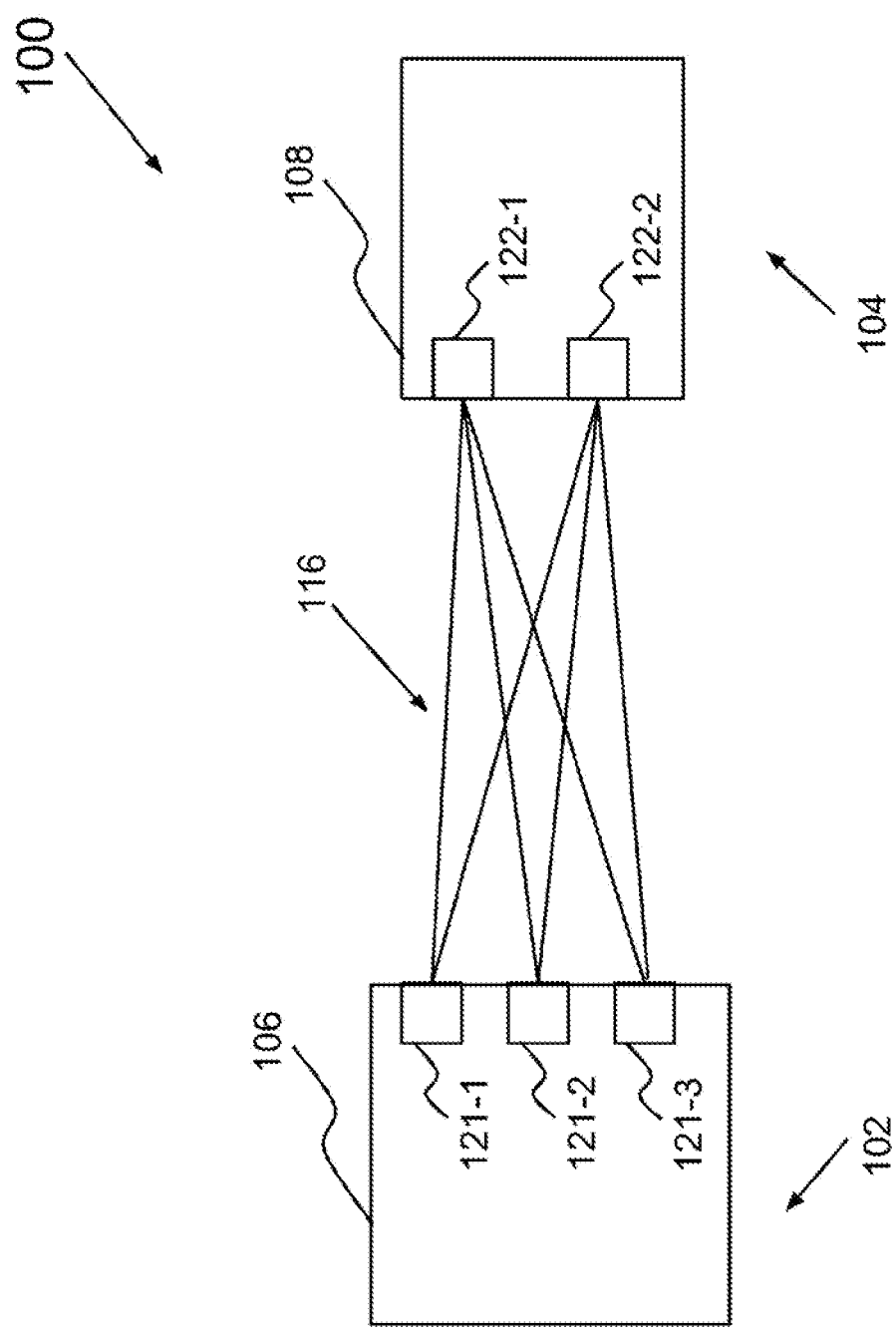
FIG. 1B illustrates a system adapted according to one of the embodiments.
Figure 2:
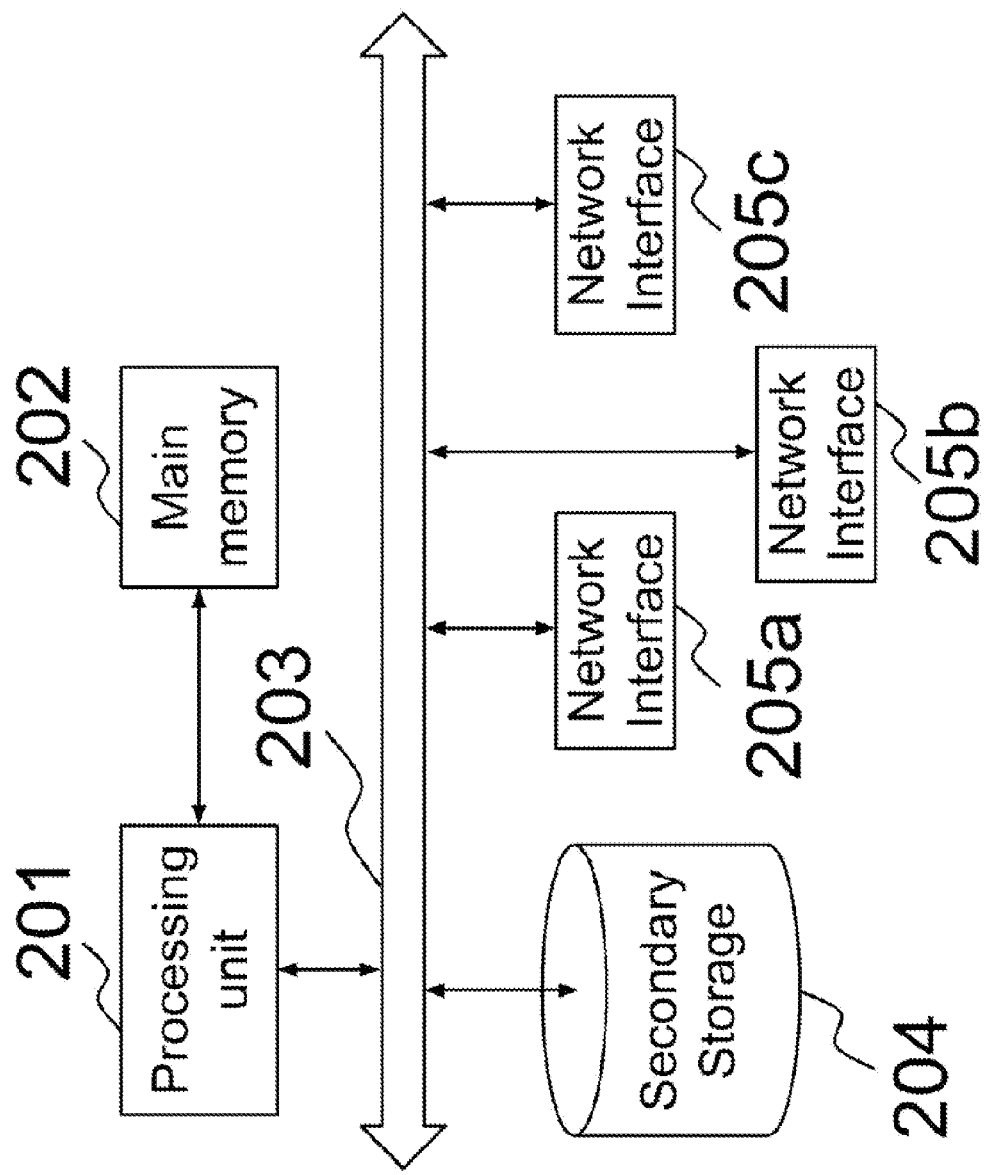
FIG. 2 is an illustrative block diagram of a network node according to one of the embodiments.
Figure 3A:
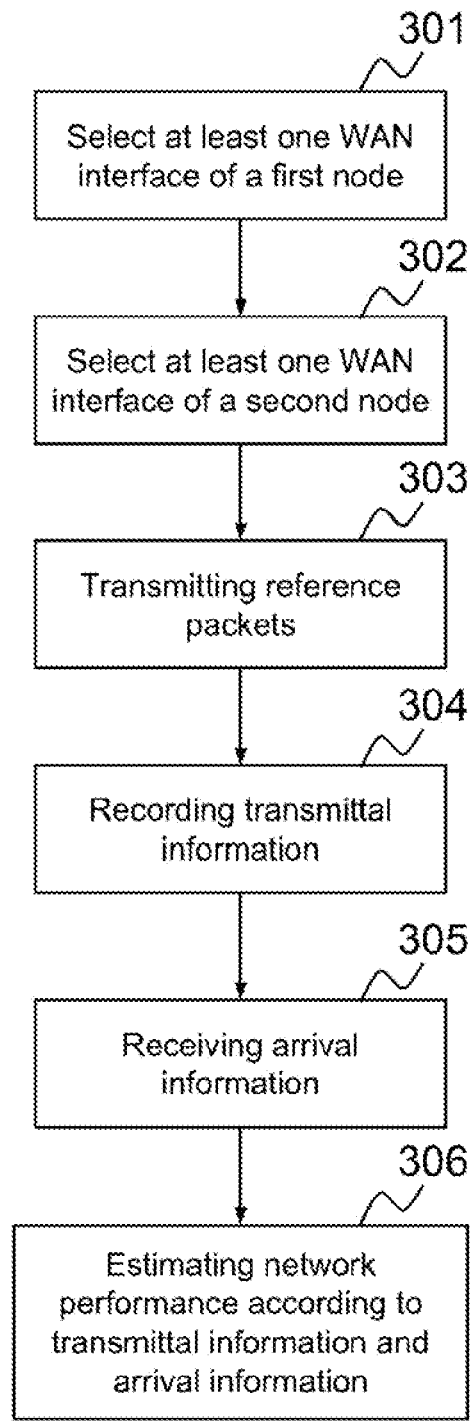
FIG. 3A illustrates a process for estimating network performance according to one of the embodiments of the present invention.
Figure 3B:
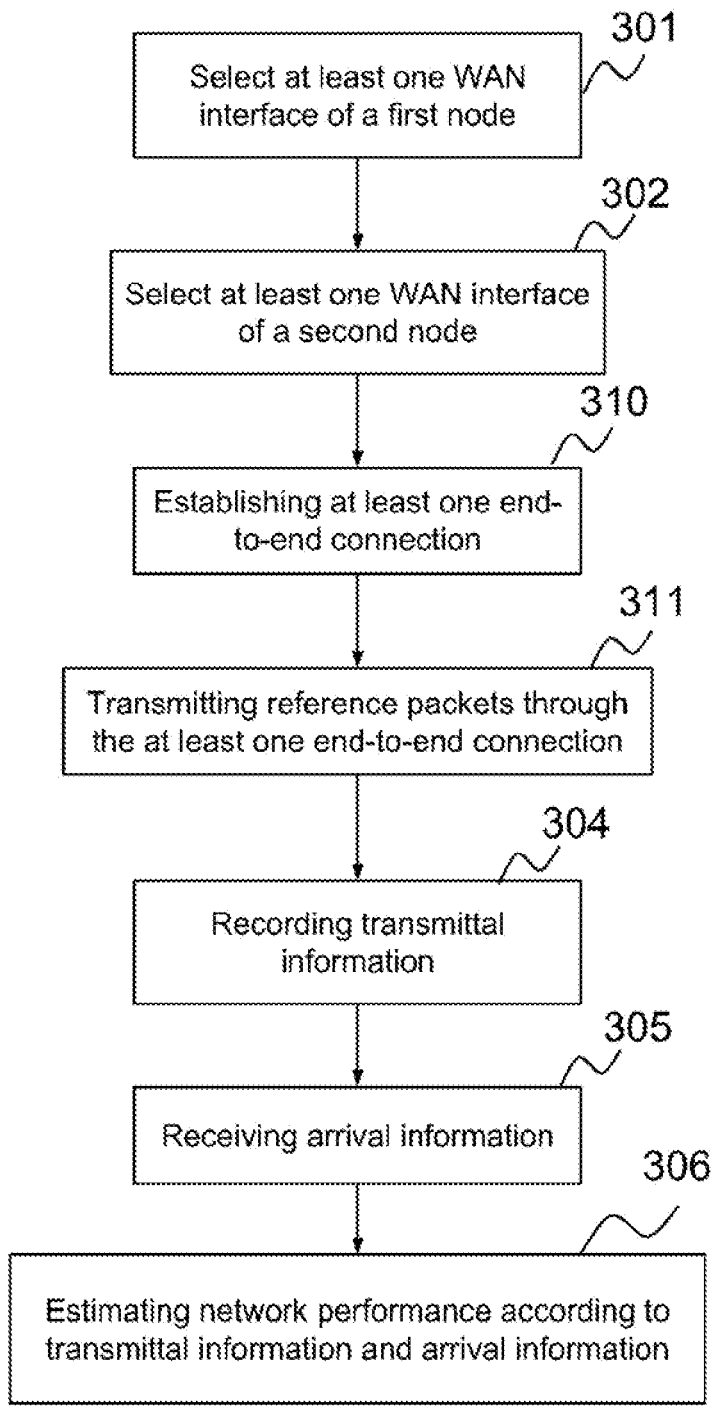
FIG. 3B illustrates a process for estimating network performance according to one of the embodiments of the present invention.
Figure 4:
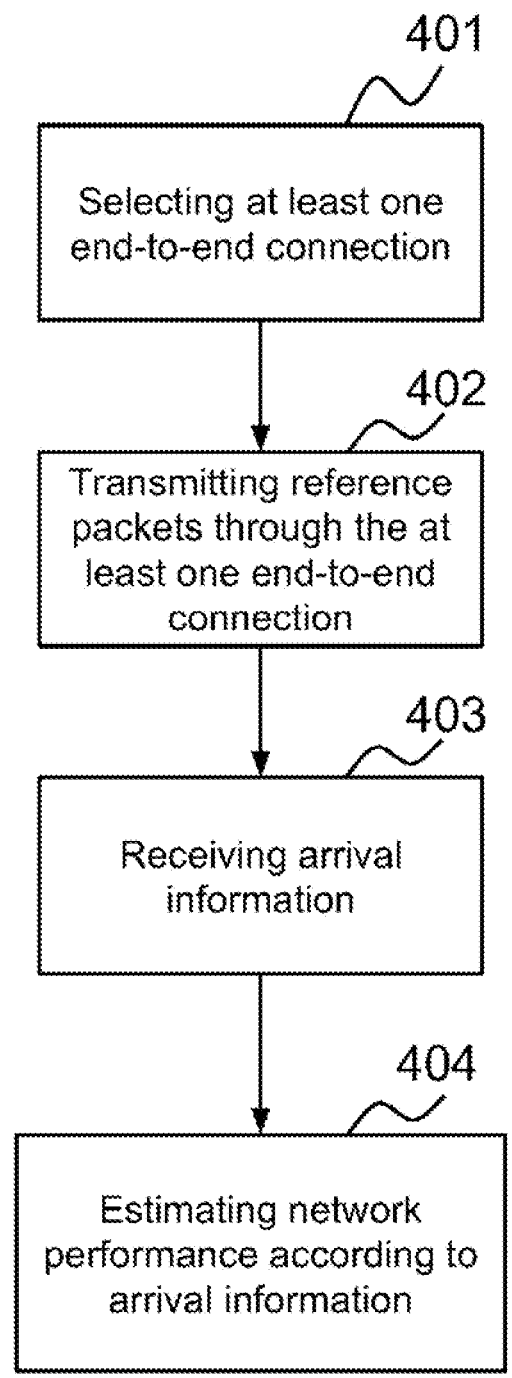
FIG. 4 illustrates a process for estimating network performance of end-to-end connections according to one of the embodiments of the present invention.
Figure 5:
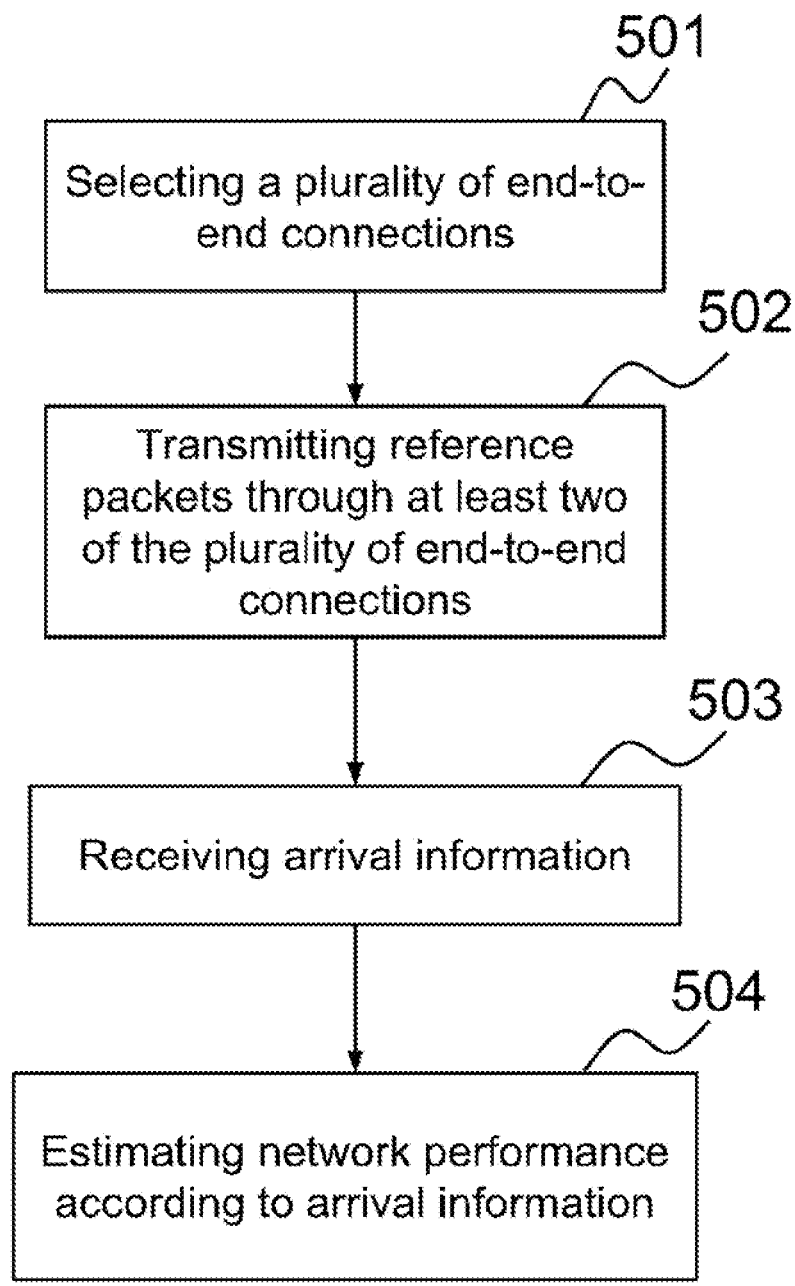
FIG. 5 illustrates a process for estimating network performance of end-to-end connections according to one of the embodiments of the present invention.
Figure 6:
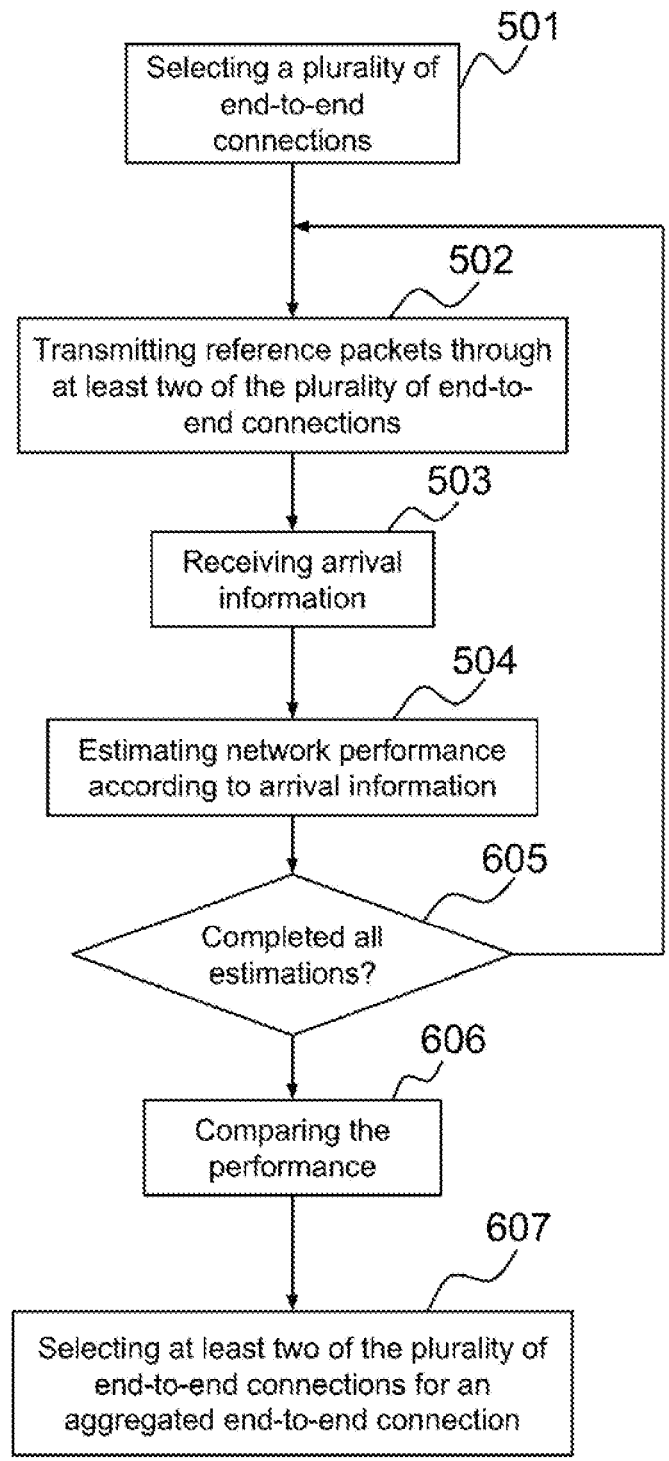
FIG. 6 illustrates a process for estimating network performance of end-to-end connections according to one of the embodiments of the present invention.
Figure 7A:
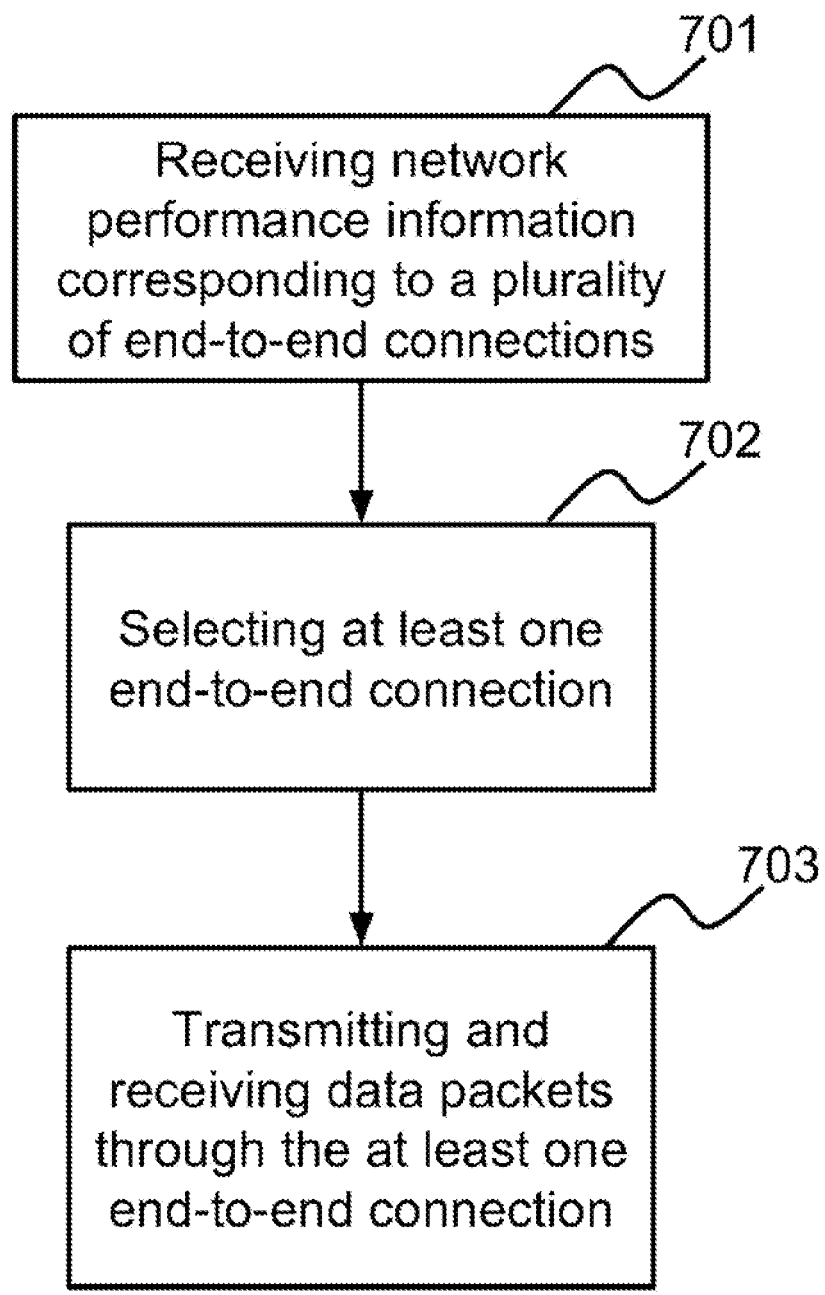
FIG. 7A illustrates a process for transmitting and receiving data packets through end-to-end connections based on network performance information according to one of the embodiments.
Figure 7B:
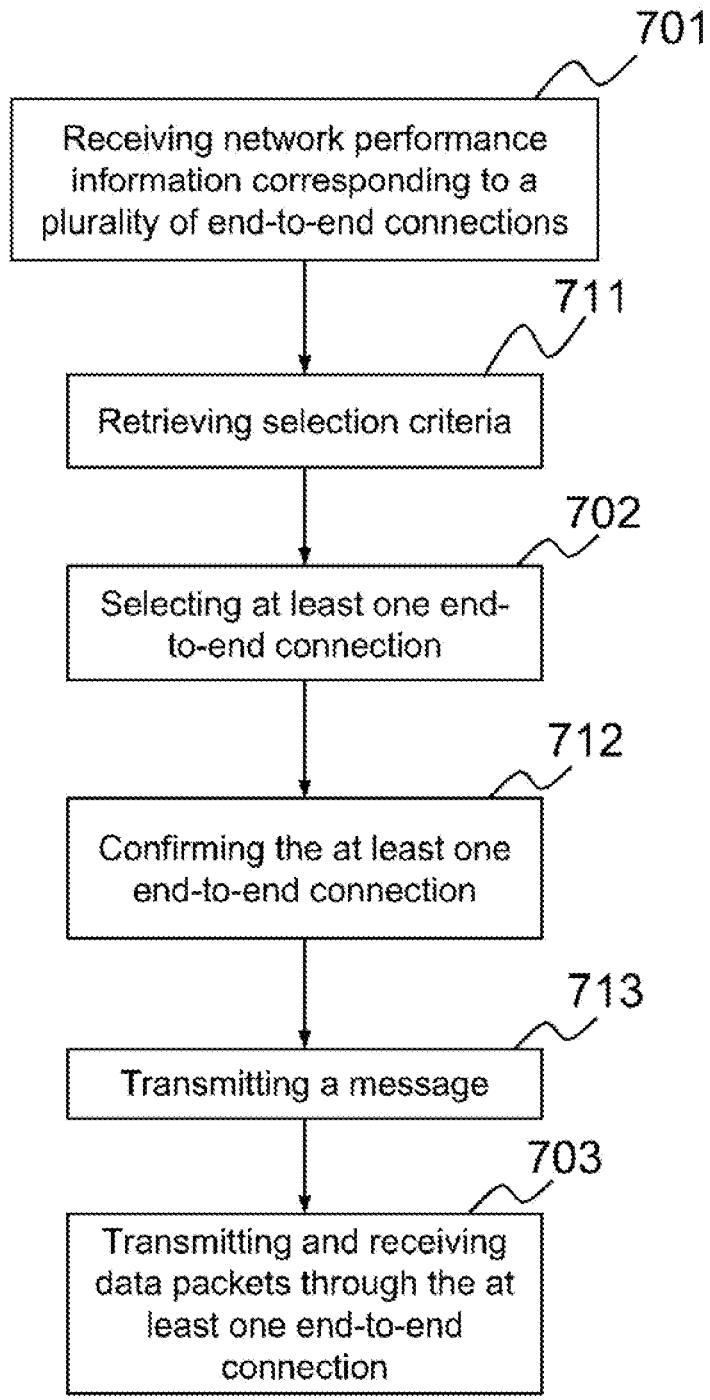
FIG. 7B illustrates a process for transmitting and receiving data packets through end-to-end connections based on network performance information according to one of the embodiments.
Figure 7C:
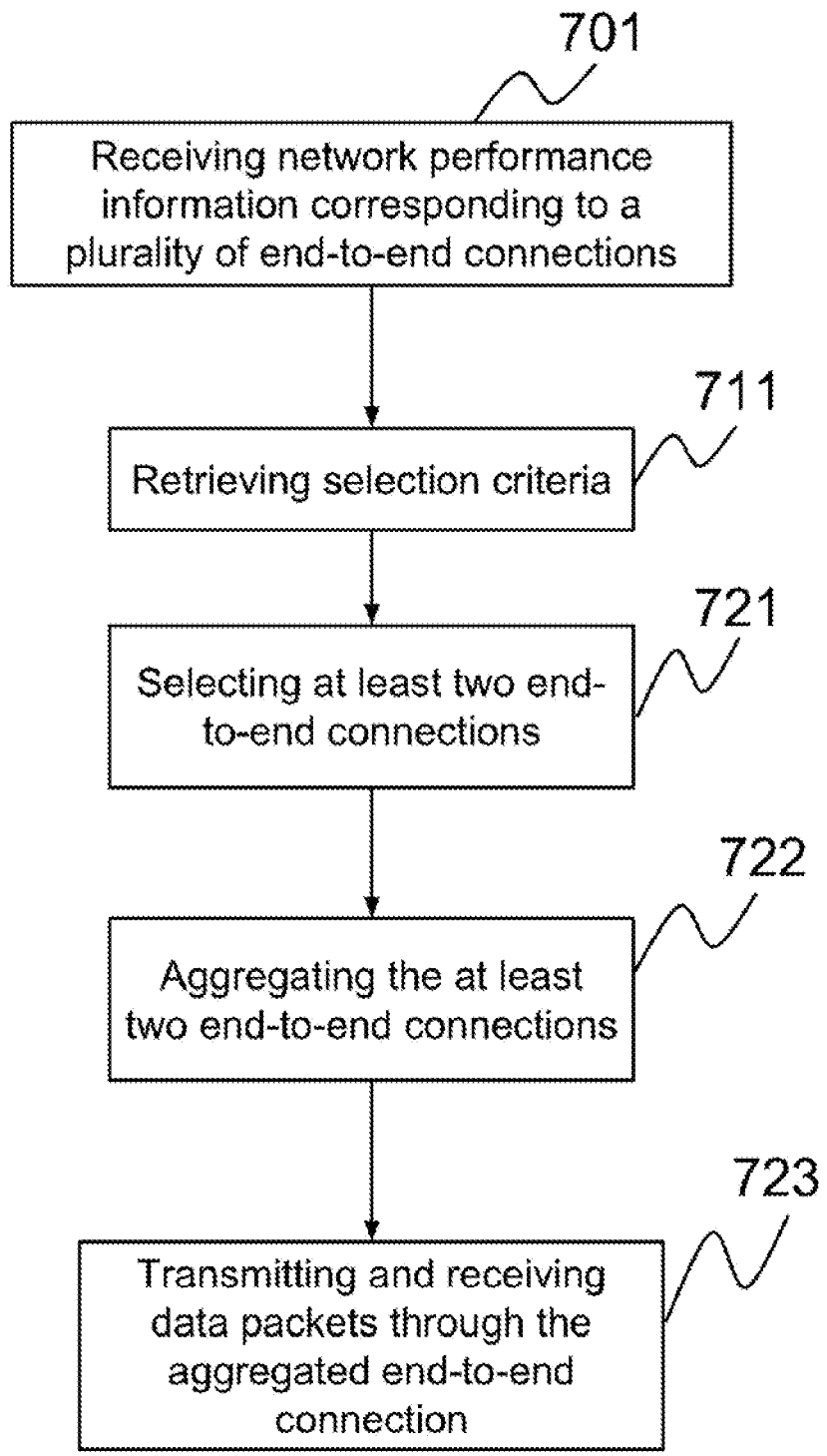
FIG. 7C illustrates a process for transmitting and receiving data packets through end-to-end connections based on network performance information according to one of the embodiments.
Figure 9:
FIG. 9 illustrates a table for displaying network performance information according to one of the embodiments.
Figure 10:
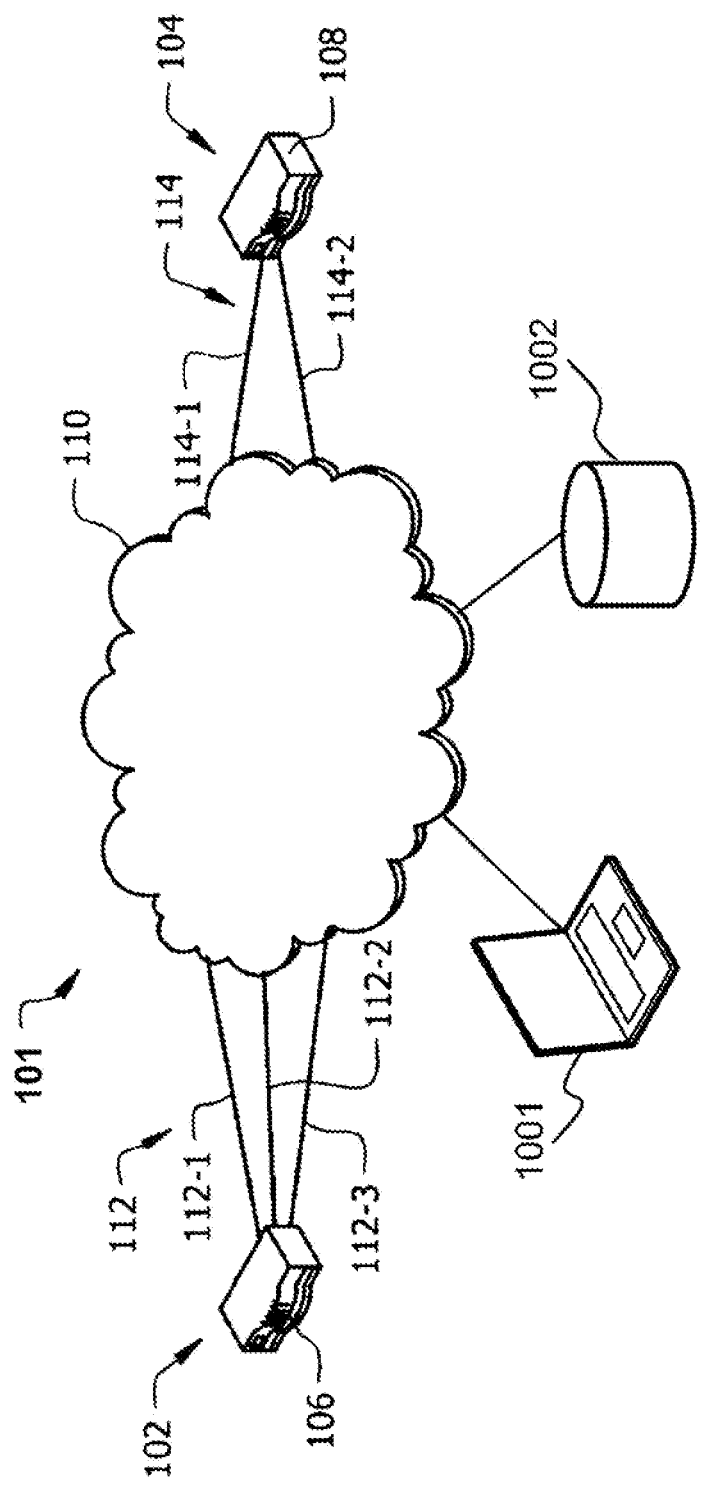
FIG. 10 illustrates a system for displaying network performance information according to one of the embodiments.
Figure 11:
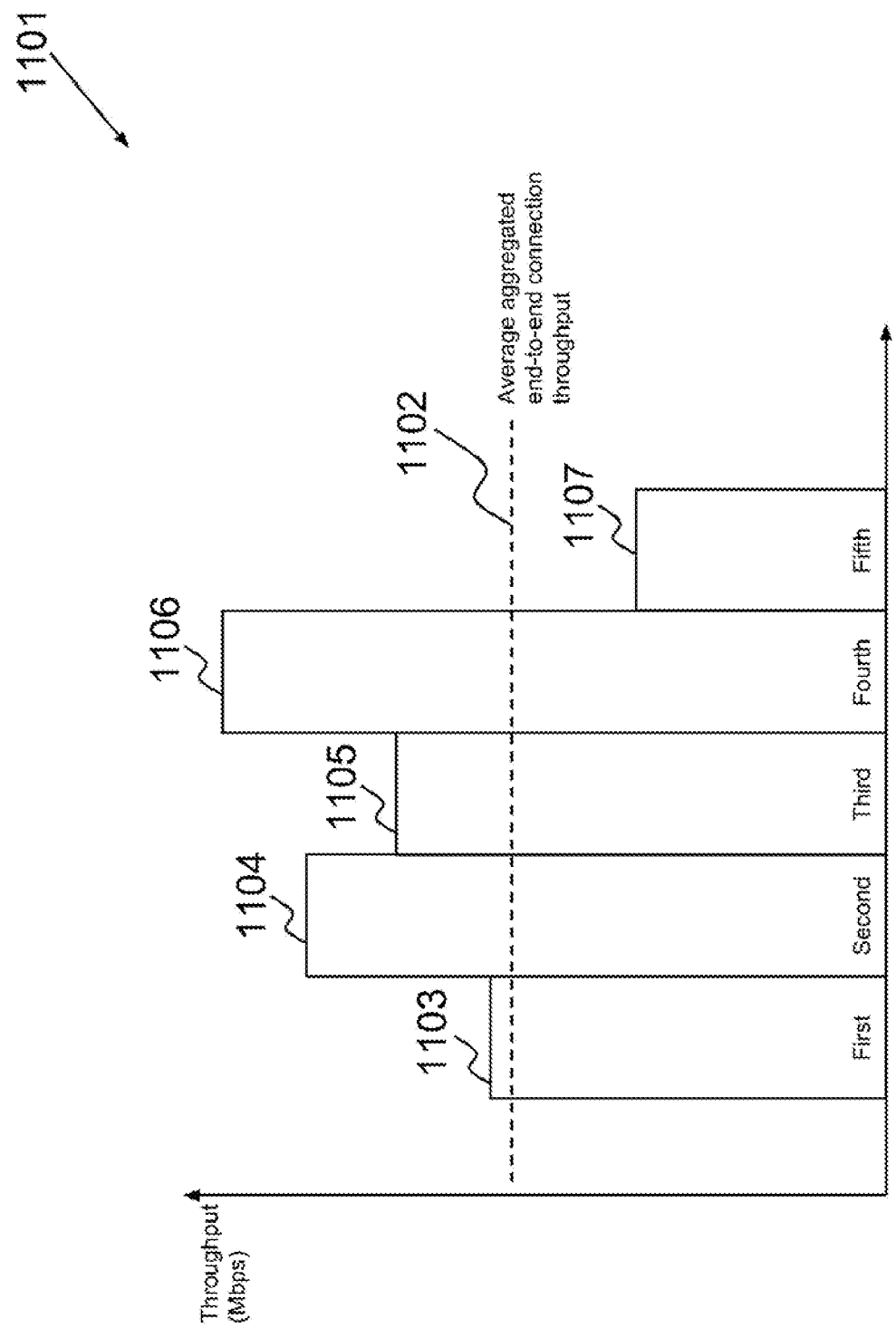
FIG. 11 illustrates a bar chart for displaying network performance information according to one of the embodiments.

The invention claimed is:

1. A method of estimating network performance, comprising the following steps:
   (a) selecting at least one first network interface of a first node;
   (b) selecting at least one second network interface of a second node;
   (c) exchanging test parameters with the second node through control messages;
   (d) establishing at least one end-to-end connection between the at least one first network interface and the at least one second network interface, according to at least one end-to-end connection profile; wherein the at least one end-to-end connection profile comprises WAN interface identities of the at least one first network interface and the at least one second network interface, source address of the at least one first network interface, destination address of the at least one second network interface, encryption standard for packets transmitted and received through the at least one end-to-end connections authentication parameters, and details of digital certificates used for authentication;
   (e) transmitting reference packets from the first node to the second node through the at least one first network interface to the at least one second network interface over a first time period;
   (f) recording transmittal information; wherein the transmittal information comprises CPU usage of the first node while transmitting the reference packets, number of bytes transmitted over the first time period, and duration over which the reference packets are transmitted;
   (g) receiving arrival information corresponding to the reference packets from the second node; wherein the arrival information comprises CPU usage of the second node while receiving the reference packets, number of bytes received over the first time period, duration over which the reference packets are received, number of reference packets that were retransmitted and round trip time (RTT);
   (h) estimating network performance by utilizing the transmittal information and arrival information;
   (i) retrieving a selection criteria; wherein the selection criteria is stored in a storage medium or a remote server;
   (j) when estimating network performance is complete, comparing the network performances and selecting at least one end-to-end connection established using the at least one first network interface and the at least one second network interface, wherein the selecting is based on the selection criteria; and
   (k) displaying information on a display; wherein the information comprises end-to-end connection profiles, network performance information of end-to-end connections, and network performance information of aggregated end-to-end connection: wherein the display is integrated in the first node, or is a laptop, a handheld computer device, a desktop, or a mobile phone that receives the network performance information from the first node or second node;
   wherein reference packets are not transmitted through more than one end-to-end connection established through a single first network interface at substantially the same time.

2. The method of estimating network performance according to claim 1, wherein the at least one first network interface and the at least one second network interface are selected according to a first policy.

3. The method of estimating network performance according to claim 1, wherein the step (e) is performed by using the at least one end-to-end connection, and wherein the at least one end-to-end connection is a virtual private network (VPN) connection.

4. The method of estimating network performance according to claim 1, further comprising aggregating at least two end-to-end connections.

5. The method of estimating network performance according to claim 1, further comprising establishing at least two end-to-end connections using the at least one first network interface and the at least one second network interface and wherein the step (e) is performed by using a plurality of the at least two end-to-end connections at substantially same time.

6. The method of estimating network performance according to claim 1, wherein the estimation of network performance begins after receiving an instruction;
   wherein the instruction is preset in the configuration file, received from a user, received from another node or host, triggered by an input in the first node, and/or triggered by a network condition.

7. The method of estimating network performance according to claim 1, wherein the arrival information further comprises at least one information selected from the group consisting of acknowledgement, packet drop rate, end-to-end connection identity, WAN interface identity, time, bandwidth information, latency information, out-of-order packets arrival information, computing resource usage information, and network performance information.

8. The method of estimating network performance according to claim 1, wherein the control message comprise at least one information selected from the group consisting of end-to-end connection profile, aggregated end-to-end connection profile, end-to-end connection identity, WAN interface identity, estimation methodology, type of arrival information, format of arrival information, and choice of protocol.

9. The method of estimating network performance according to claim 1, wherein the at least one first network interface of the first node and the at least one second network interface of the second node are selected according to an end-to-end connection profile or an aggregated end-to-end connection profile.

10. The method of estimating network performance according to claim 1, further comprising sending a message after the estimating is performed or partially performed, wherein the message comprise information corresponding to the network performance.

11. A first node configured for estimating network performance, comprising:
  a plurality of network interfaces;
  at least one processing unit; and
  at least one storage unit storing program instructions executable by the at least one processing unit for:
  (a) selecting at least one first network interface of a first node;
  (b) selecting at least one second network interface of a second node;
  (c) exchanging test parameters with the second, node through control messages;
  (d) establishing at least one end-to-end connection between the at least one first network interface and the at least one second network interface, according to at least one end-to-end connection profile; wherein the at least one end-to-end connection profile comprises WAN interface identities of the at least one first network interface and the at least one second network interface., source address of the at least one first network interface, destination address of the at least one second network interface, encryption standard for packets transmitted and received through the at least one end-to-end connections authentication parameters. and details of digital certificates used for authentication;
  (e) transmitting reference packets from the first node to the second node through the at least one first network interface to the at least one second network interface over a first time period;
  (f) recording transmittal formation; wherein the transmittal information comprises CPU usage of the first node while transmitting the reference packets, number of bytes transmitted over the first time period and duration over which the reference packets are transmitted;
  (g) receiving arrival information corresponding to the reference packets from the second node; wherein the arrival information comprises CPU usage of the second node while receiving the reference packets, number of bytes received over the first time period, duration over which the reference packets are received, number of reference packets that were retransmitted and round trip time (RTT);
  (h) estimating network performance by utilizing the transmittal information and arrival information;
  (i) retrieving a selection criteria; wherein the selection criteria is stored in a storage medium or a remote server;
  (j) when estimating network performance is complete, comparing the network performances, and selecting at least one end-to-end connection established using the at least one first network interface and the at least one second network interface, wherein the selecting is based on the selection criteria; and
  (k) displaying information on a display; wherein the information comprises end-to-end connection profiles, network performance information of end-to-end connections, and network performance information of aggregated end-to-end connection: wherein the display is integrated in the first node, or is a laptop, a handheld computer device, a desktop, or a mobile phone that receives the network performance information from the first node or second node;
  wherein reference packets are not transmitted through more than one end-to-end connection established through a single first network interface at substantially the same time.

12. The first node of claim 11, wherein the at least one first network interface and the at least one second network interface are selected according to a first policy.

13. The first node of claim 11, wherein the step (e) is performed by using the at least one end-to-end connection, and wherein the at least one end-to-end connection is a virtual private network (VPN) connection.

14. The first node of claim 11, wherein the at least one storage unit further storing program instructions executable by the at least one processing unit for aggregating at least two end-to-end connections.

15. The first node of claim 11, wherein the at least one storage unit further storing program instructions executable by the at least one processing unit for:
  establishing at least two end-to-end connections using the at least one first network interface and the at least one second network interface and wherein the step (e) is performed by using a plurality of the at least two end-to-end connections at substantially same time.

16. The first node of claim 11, wherein the estimation of network performance begins after receiving an instruction: wherein the instruction is preset in the configuration file, received from a user, received from another node or host, triggered by an input in the first node, and/or triggered by a network condition.

17. The first node of claim 11, wherein the arrival information further comprises at least one information selected from the group consisting of acknowledgement, packet drop rate, end-to-end connection identity, WAN interface identity, time, bandwidth information, latency information, out-of-order packets arrival information, computing resource usage information, and network performance information.

18. The first node of claim 11, wherein the control message comprises at least one information selected from the group consisting of end-to-end connection profile, aggregated end-to-end connection profile, end-to-end connection identity, WAN interface identity, estimation methodology, type of arrival information, format of arrival information, and choice of protocol.

19. The first node of claim 11, wherein the at least one first network interface of the first node and the at least one second network interface of the second node are selected according to an end-to-end connection profile or an aggregated end-to-end connection profile.

20. The first node of claim 11, wherein the at least one storage unit further storing program instructions executable by the at least one processing unit for sending a message after the estimating is performed or partially performed, wherein the message comprise information corresponding to the network performance.

* * * * *